US009325217B2

(12) United States Patent
Veltri

(10) Patent No.: US 9,325,217 B2
(45) Date of Patent: Apr. 26, 2016

(54) FLYWHEEL ENERGY SYSTEM

(75) Inventor: Jeffrey Allan Veltri, Burlington, CA (US)

(73) Assignee: TEMPORAL POWER LTD., Mississauga, Ontario (CA)

( * ) Notice: Subject to any disclaimer, the term of this patent is extended or adjusted under 35 U.S.C. 154(b) by 1254 days.

(21) Appl. No.: 13/153,216

(22) Filed: Jun. 3, 2011

(65) Prior Publication Data

US 2011/0298293 A1 Dec. 8, 2011

Related U.S. Application Data

(60) Provisional application No. 61/352,810, filed on Jun. 8, 2010.

(51) Int. Cl.
| H02J 3/38 | (2006.01) |
| H02K 5/10 | (2006.01) |
| H02K 9/19 | (2006.01) |
| H02K 7/09 | (2006.01) |

(Continued)

(52) U.S. Cl.
CPC .............. *H02K 7/025* (2013.01); *F16C 39/063* (2013.01); *F16F 15/3156* (2013.01); *F16C 32/0417* (2013.01); *F16C 2361/55* (2013.01); *F16F 2222/06* (2013.01); *Y02E 60/16* (2013.01); *Y10T 307/718* (2015.04)

(58) Field of Classification Search
CPC .................................. F03G 3/98; F16F 15/30
USPC ......................................... 310/74; 74/572.11
See application file for complete search history.

(56) References Cited

U.S. PATENT DOCUMENTS

| 2,894,155 A | 7/1959 | Labastie |
| 3,514,625 A | 5/1970 | Lane |

(Continued)

FOREIGN PATENT DOCUMENTS

| AU | 2004305778 A1 | 3/2005 |
| AU | 2011200041 A1 | 1/2011 |

(Continued)

OTHER PUBLICATIONS

Neodymium magnet—en.wikipedia.org, Jan. 10, 2015.*

(Continued)

*Primary Examiner* — Vinh Luong
(74) *Attorney, Agent, or Firm* — Sterne, Kessler, Goldstein & Fox P.L.L.C.

(57) ABSTRACT

An energy storage system comprises a housing and a flywheel having a drive shaft portion attached to a cylindrical ferromagnetic rotor portion. The drive shaft portion defines a substantially vertical axis about which the rotor portion is mounted for rotation. A magnetic bearing assembly comprised of an annular permanent magnet having no electromagnetic components is mounted on the housing in stationary centered relation about the vertical axis above the rotor portion so as to attract the rotor portion axially upwardly towards a lower face of permanent magnet, thereby supporting a significantly high portion of the weight of the flywheel. At least one low friction mechanical bearing assembly is mounted within the housing about the drive shaft portion to provide radial positioning of the rotor portion and to limit at least upward axial movement of the rotor portion in relation to the lower face. The annular permanent magnet overlies a portion of the end face of the rotor with the balance providing a return path for magnetic flux.

38 Claims, 16 Drawing Sheets

(51) Int. Cl.
*H02K 7/02* (2006.01)
*F16C 39/06* (2006.01)
*F16F 15/315* (2006.01)
*F16C 32/04* (2006.01)

(56) References Cited

U.S. PATENT DOCUMENTS

| | | |
|---|---|---|
| 3,665,495 A | 5/1972 | Carter et al. |
| 3,667,012 A | 5/1972 | Kilgore |
| 4,001,666 A | 1/1977 | Grenfell |
| 4,221,452 A | 9/1980 | Remington |
| 4,223,240 A | 9/1980 | Theyse |
| 4,434,393 A | 2/1984 | Kobari et al. |
| 4,511,190 A | 4/1985 | Caye et al. |
| 4,563,046 A | 1/1986 | Shimamoto |
| 4,566,740 A | 1/1986 | Beau et al. |
| 4,620,272 A | 10/1986 | Fulton et al. |
| 4,700,094 A | 10/1987 | Downer et al. |
| 4,723,735 A | 2/1988 | Eisenhaure et al. |
| 4,785,212 A | 11/1988 | Downer et al. |
| 5,057,697 A | 10/1991 | Hammond et al. |
| 5,124,605 A | 6/1992 | Bitterly et al. |
| 5,126,610 A | 6/1992 | Fremerey |
| 5,250,865 A | 10/1993 | Meeks |
| 5,329,222 A | 7/1994 | Gyugyi et al. |
| 5,449,989 A | 9/1995 | Correa et al. |
| 5,541,460 A | 7/1996 | Dunfield et al. |
| 5,614,777 A | 3/1997 | Bitterly et al. |
| 5,619,083 A | 4/1997 | Dunfield et al. |
| 5,635,770 A | 6/1997 | Evans, Jr. et al. |
| 5,699,666 A | 12/1997 | Kurten et al. |
| 5,708,312 A | 1/1998 | Rosen et al. |
| 5,759,589 A | 6/1998 | George, Jr. |
| 5,760,506 A | 6/1998 | Ahlstrom et al. |
| 5,763,971 A | 6/1998 | Takahata et al. |
| 5,780,980 A | 7/1998 | Naito |
| 5,798,633 A | 8/1998 | Larsen et al. |
| 5,821,651 A | 10/1998 | Lansberry et al. |
| 5,847,480 A | 12/1998 | Post |
| 5,894,181 A | 4/1999 | Imlach |
| 5,912,519 A | 6/1999 | Horner et al. |
| 5,917,251 A | 6/1999 | Schermann et al. |
| 5,920,138 A | 7/1999 | Clifton et al. |
| 5,921,505 A | 7/1999 | Spector |
| 5,932,935 A | 8/1999 | Clifton et al. |
| 5,939,102 A | 8/1999 | George, Jr. |
| 5,942,825 A | 8/1999 | Lee |
| 5,945,754 A | 8/1999 | Fulwood et al. |
| 5,969,446 A * | 10/1999 | Eisenhaure ......... F16F 15/1428 310/51 |
| 5,969,457 A | 10/1999 | Clifton et al. |
| 5,994,794 A | 11/1999 | Wehrlen |
| 5,998,899 A | 12/1999 | Rosen et al. |
| 6,019,319 A | 2/2000 | Falbel |
| 6,023,152 A | 2/2000 | Briest et al. |
| 6,134,124 A | 10/2000 | Jungreis et al. |
| 6,144,128 A | 11/2000 | Rosen |
| 6,166,472 A | 12/2000 | Pinkerton et al. |
| 6,169,390 B1 | 1/2001 | Jungreis |
| 6,175,166 B1 | 1/2001 | Bapat |
| 6,215,202 B1 | 4/2001 | Luongo et al. |
| 6,227,817 B1 | 5/2001 | Paden |
| 6,231,011 B1 | 5/2001 | Chu et al. |
| 6,262,505 B1 | 7/2001 | Hockney et al. |
| 6,268,674 B1 | 7/2001 | Takahashi |
| 6,304,015 B1 | 10/2001 | Filatov et al. |
| 6,347,925 B1 | 2/2002 | Woodard et al. |
| 6,388,347 B1 | 5/2002 | Blake et al. |
| 6,441,581 B1 | 8/2002 | King et al. |
| 6,448,679 B1 | 9/2002 | Imlach |
| 6,464,472 B1 | 10/2002 | Sekiguchi et al. |
| 6,522,031 B2 | 2/2003 | Provanzana et al. |
| 6,566,775 B1 | 5/2003 | Fradella |
| 6,570,286 B1 | 5/2003 | Gabrys |
| 6,583,528 B2 | 6/2003 | Gabrys |
| 6,585,490 B1 | 7/2003 | Gabrys et al. |
| 6,614,132 B2 | 9/2003 | Hockney et al. |
| 6,624,532 B1 | 9/2003 | Davidow et al. |
| 6,624,542 B1 | 9/2003 | Gabrys et al. |
| 6,630,761 B1 | 10/2003 | Gabrys |
| 6,664,680 B1 | 12/2003 | Gabrys |
| 6,675,872 B2 | 1/2004 | Lewis et al. |
| 6,700,258 B2 | 3/2004 | McMullen et al. |
| 6,703,735 B1 | 3/2004 | Gabrys |
| 6,707,187 B1 * | 3/2004 | Gabrys .......................... 310/74 |
| 6,710,489 B1 | 3/2004 | Gabrys |
| 6,727,617 B2 | 4/2004 | McMullen et al. |
| 6,737,762 B2 | 5/2004 | Koenig |
| 6,741,007 B2 | 5/2004 | Frash et al. |
| 6,747,378 B2 | 6/2004 | Brackett |
| 6,794,776 B1 | 9/2004 | Gabrys |
| 6,806,605 B1 | 10/2004 | Gabrys |
| 6,817,266 B1 | 11/2004 | Brackett |
| 6,824,861 B2 | 11/2004 | Spears |
| 6,825,588 B2 | 11/2004 | Gabrys et al. |
| 6,852,401 B2 | 2/2005 | Spears et al. |
| 6,882,072 B2 | 4/2005 | Wingett et al. |
| 6,882,904 B1 | 4/2005 | Petrie et al. |
| 6,884,039 B2 | 4/2005 | Woodard et al. |
| 6,897,587 B1 | 5/2005 | McMullen et al. |
| 6,914,349 B2 | 7/2005 | Rajagopalan |
| 6,959,756 B2 | 11/2005 | Woodard et al. |
| 6,980,891 B2 | 12/2005 | Nagafuchi et al. |
| 6,995,529 B2 * | 2/2006 | Sibley ........................... 318/161 |
| 7,034,420 B2 | 4/2006 | Brackett et al. |
| 7,052,253 B2 | 5/2006 | Izraelev |
| 7,053,589 B2 | 5/2006 | Gabrys et al. |
| 7,071,581 B2 | 7/2006 | Eisenhaure et al. |
| 7,174,806 B2 | 2/2007 | Brackett et al. |
| 7,197,958 B2 | 4/2007 | Brault et al. |
| 7,267,028 B2 * | 9/2007 | Gabrys ..................... 74/572.11 |
| 7,343,361 B2 | 3/2008 | Peljto et al. |
| 7,358,620 B2 | 4/2008 | Melfi |
| 7,365,461 B2 | 4/2008 | Brackett et al. |
| 7,416,039 B1 | 8/2008 | Anderson et al. |
| 7,566,990 B2 | 7/2009 | Loucks et al. |
| 7,679,245 B2 | 3/2010 | Brackett et al. |
| 7,679,247 B2 | 3/2010 | Wang |
| 7,715,951 B2 | 5/2010 | Forbes, Jr. et al. |
| 7,786,616 B2 | 8/2010 | Naden et al. |
| 7,830,055 B2 | 11/2010 | Arseneaux et al. |
| 7,834,479 B2 | 11/2010 | Capp et al. |
| 7,847,423 B1 | 12/2010 | Farkas |
| 8,008,804 B2 | 8/2011 | Capp et al. |
| 8,030,787 B2 | 10/2011 | Kalev |
| 8,102,144 B2 | 1/2012 | Capp et al. |
| 8,314,527 B2 | 11/2012 | Wang |
| 8,343,603 B2 | 1/2013 | Negle |
| 8,669,675 B2 | 3/2014 | Capp et al. |
| 2002/0041126 A1 | 4/2002 | Provanzana et al. |
| 2003/0010037 A1 | 1/2003 | Vugdelija |
| 2003/0155831 A1 | 8/2003 | Gabrys et al. |
| 2003/0160595 A1 | 8/2003 | Provanzana et al. |
| 2003/0225483 A1 | 12/2003 | Santinato et al. |
| 2004/0126635 A1 | 7/2004 | Pearson |
| 2004/0135436 A1 | 7/2004 | Gilbreth et al. |
| 2004/0150374 A1 | 8/2004 | Kraus |
| 2004/0256929 A1 * | 12/2004 | Gabrys et al. ................. 310/74 |
| 2005/0035744 A1 | 2/2005 | Potter et al. |
| 2005/0150323 A1 | 7/2005 | Spears |
| 2007/0014980 A1 | 1/2007 | Spears |
| 2007/0103009 A1 | 5/2007 | Yang |
| 2008/0315696 A1 | 12/2008 | Wang |
| 2009/0317233 A1 * | 12/2009 | Carter ................. B81C 1/00198 415/83 |
| 2010/0237629 A1 | 9/2010 | Gray |
| 2010/0264759 A1 | 10/2010 | Shafer et al. |
| 2011/0175371 A1 | 7/2011 | Gray |
| 2011/0278853 A1 | 11/2011 | Capp et al. |
| 2012/0056483 A1 | 3/2012 | Capp et al. |
| 2012/0065805 A1 | 3/2012 | Montalvo |
| 2013/0002064 A1 | 1/2013 | De Bock et al. |
| 2013/0043750 A1 | 2/2013 | Wang |

(56) References Cited

U.S. PATENT DOCUMENTS

| | | | |
|---|---|---|---|
| 2013/0270914 A1 | 10/2013 | Veltri | |
| 2014/0084756 A1* | 3/2014 | Kalev | H02K 7/025 310/67 R |
| 2014/0124172 A1* | 5/2014 | Veltri | F16F 15/302 165/104.19 |

FOREIGN PATENT DOCUMENTS

| | | |
|---|---|---|
| BR | PI 0413598-9 A | 10/2006 |
| CA | 2.535.458 A1 | 3/2005 |
| CA | 2 801 307 A1 | 12/2011 |
| CA | 2 813 020 A1 | 10/2013 |
| CN | 103038541 A | 4/2013 |
| EP | 0 235 555 B1 | 5/1992 |
| EP | 0 291 742 B1 | 2/1993 |
| EP | 0 872 942 A2 | 10/1998 |
| EP | 1 271 741 A2 | 1/2003 |
| EP | 1 394 928 A3 | 9/2004 |
| EP | 1 171 946 B1 | 8/2006 |
| EP | 1 275 822 B1 | 5/2009 |
| EP | 2 330 726 A2 | 6/2011 |
| JP | 6-284583 A | 10/1994 |
| JP | 2000-014013 A | 1/2000 |
| JP | 2007-503191 A | 2/2007 |
| JP | 2013-531452 A | 8/2013 |
| KR | 10-2013-0121703 A1 | 11/2013 |
| MX | 2012014398 A | 6/2013 |
| WO | WO 98/43341 A1 | 10/1998 |
| WO | WO 99/13553 A1 | 3/1999 |
| WO | WO 99/50945 A1 | 10/1999 |
| WO | WO 01/17092 A1 | 3/2001 |
| WO | WO 02/03523 A2 | 1/2002 |
| WO | WO 02/097945 A2 | 12/2002 |
| WO | WO 02/103879 A1 | 12/2002 |
| WO | WO 03/023224 A1 | 3/2003 |
| WO | WO 2005/029667 A2 | 3/2005 |
| WO | WO 2011/090511 A2 | 7/2011 |
| WO | WO 2011/153612 A2 | 12/2011 |
| WO | WO 2013/096946 A1 | 6/2013 |
| WO | WO 2013/155598 A1 | 10/2013 |

OTHER PUBLICATIONS

Magnet—en.wikipedia.org, Jan. 10, 2015.*
The Electrodyne Company, Reance F Flexible Neodymium Rare Earth Magnets, edyne.com, Jan. 12, 2015.*
Brushless DC electric motor, wikipedia.org, Jan. 10, 2015.*
Friction—Wikipedia, the free encyclopedia, Jul. 26, 2015.*
M Zarzour and J Vance, Experimental Evaluation of a Metal Mesh Bearing Damper, Transactions of the ASME, vol. 122, pp. 326-329, Apr. 2000.
Hearn, C.S. et al.; "Low cost Flywheel Energy Storage for a Fuel Cell Powered Transit Bus"; Vehicle Power and Propulsion Conference, Sep. 9-12, 2007, VPPC 2007; IEEE; ISBN: 978-0-7803-9760-6.
Park, Jae-Do; "Simple Flywheel Energy Storage using Squirrel-Cage Induction Machine for DC Bus Microgrid Systems"; IECON 2010—36th Annual Conference on IEEE Industrial Electronics Soceity; Nov. 7-10, 2012; pp. 3040-3045.
Rojas, A. "Flywheel Energy Matrix Systems—Today's Technology, Tomorrow's Energy Storage Solution"; 2003; Beacon Power Corp.
Energy Storage The Missing Link in the Electricity Value Chain, An ESC White Paper; May 2002; Section A.3, pp. 46 to 49; Energy Storage Council.
Burwell, D.; Search Report from corresponding PCT Application No. PCT/CA2011/000641; search completed Sep. 30, 2011.
Aditya, S.K. et al., "Battery energy storage for load frequency control of an interconnected power system," Electric Power Systems Research 58, pp. 179-185, Feb. 2001.
Akagi, H., "Active filters and energy storage systems operated under non-periodic conditions," Power Engineering Society Summer Meeting, 2000, IEEE, vol. 2, 16-20, pp. 965-970, Jul. 2000.
Akhil, A. et al., "Cost Analysis of Energy Storage Systems for Electric Utility Applications,", Sandia National Laboratories, 62 pages, Feb. 1997.
Athay, T.M., "Generation Scheduling and Control," Proceedings of the IEEE, vol. 75, No. 12, pp. 1592-1606, Dec. 1987.
Bender, D. A. et al., "DC Power Management with a High Performance Flywheel," AFS Trinity Power Corporation, EESAT 2002 Conference, 4 pages, Apr. 2002.
Bender, D. A. et al., "DC Power Management with a High Performance Flywheel," presentation, AFS Trinity Power Corporation, EESAT 2002 Conference, 12 pages, Apr. 2002.
Bhatnager, D. et al., "Market and Policy Barriers to Energy Storage Deployment," Scandia National Laboratories, 58 pages, Sep. 2013.
Bornemann, II.J. et al., "Conceptual system design of a 5 MWh/100 MW superconducting flywheel energy storage plant for power utility applications," IEEE Transactions on Applied Superconductivity, vol. 7, Issue 2, Part 1, pp. 398-401, Jun. 1997.
Bose, A. et al., "Impact of New Energy Technologies on Generation Scheduling," IEEE Transactions on Power Apparatus and Systems, vol. PAS-103, No. 1, pp. 66-71, Jan. 1984
Butler, P., et al., "Energy Storage Opportunities Analysis Phase II Final Report A Study for the DOE Energy Storage Systems Program," Sandia National Laboratories, 60 pages, May 2002.
Butler, P.C., "Battery Energy Storage for Utility Applications: Phase I—Opportunities Analysis," Sandia National Laboratories, 69 pages, Oct. 1994.
Canadian Office Action for Application No. CA 2,535,458, dated Jan. 27, 2014.
"Chino Battery Energy Storage Power Plant: First Year of Operation," Bechtel Group, Inc., 236 pages, Dec. 1992.
Cook, G.M. et al., "Overview of Battery Power Regulation and Storage," IEEE Transactions on Energy Conversion, vol. 6, No. 1, pp. 204-211, Mar. 1991.
Day, A.C. et al., "Flywheels With All-Passive, Non-Contact Magnetic Suspensions," presentation, Boeing Phantom Work, EESAT 2002 Conference, 18 pages, Apr. 2002.
Day, A.C. et al., "Flywheels With All-Passive, Non-Contact Magnetic Suspensions," Boeing, EESAT 2002 Conferernce, 6 pages, Apr. 2002.
European Search Report Issued in European Application No. 048095772.2, 3 pages, dated Feb. 22, 2012.
Gordon, S.P. et al., eds., "The Emerging Roles of Energy Storage in a Competitive Power Market: Summary of a DOE Workshop," Sandia National Laboratories, 78 pages, Jun. 1995.
Hampton, D. E. et al., "Emergency control of power system frequency using flywheel energy injection," Advances in Power System Control, Operation and Management, APSCOM-91, pp. 662-666, Nov. 1991.
Hebner, R. et al., "Flywheel Batteries Come Around Again," IEEE Spectrum, pp. 46-51, Apr. 2002.
Higgins, M.A. et al., "Flywheel Energy Storage for Electric Utility Load Leveling," Proc. of the 26th Intersociety Energy Conversion Engineering Conference, vol. 4, pp. 209-214, Aug. 1991.
Hockney, R. et al., "Powering of Remote Node Locations Using Flywheel Energy Storage," IEEE, 18th International Telecommunications Energy Conference, pp. 662-667, Oct. 1996.
Hockney, R. et al., "Powering of Standby Power Supplies Using Flywheel Energy Storage," IEEE, pp. 105-109, 1997.
International Search Report and Written Opinion of the International Searching Authorities for International Application No. PCT/CA2013/000359, 9 pages, mailed on Aug. 29, 2013.
International Search Report and Written Opinion of the International Searching Authority for International Application No. PCT/CA2013/050840, 8 pages, mailed on Jan. 30, 2014.
International Search Report for Application No. PCT/US04/26721, 2 pages, mailed Nov. 1, 2005.
Jiancheng, Z., et al., "Research on Flywheel Energy Storage System for Power Quality," IEEE, pp. 496-499, 2002.
Kirby, B.J., "Frequency Regulation Basics and Trends," Oak Ridge National Laboratory, U.S. Department of Energy, 32 pages, Dec. 2004.

(56) References Cited

OTHER PUBLICATIONS

Kottick, D. et al., "Battery Energy Storage for Frequency Regulation in an Island Power System," IEEE Transaction on Energy Conversion, vol. 8, No. 3, pp. 455-459, Sep. 1993.

Kunisch, H.J. et al., "Battery Energy Storage: Another Option for Load-Frequency-Control and Instataneous Reserve," IEEE Transactions on Energy Conversion, vol. EC-1, No. 3, pp. 41-46, Sep. 1986.

Lazarewicz, M., "A Description of the Beacon Power High Energy and High Power Composite Flywheel Energy Storage System," presentation, EESAT 2002 Conference, 23 pages, Apr. 2002.

Lazarewicz, M., "A Description of the Beacon Power High Energy and High Power Composite Flywheel Energy Storage Systems," EESAT 2002 Conference, 6 pages, Apr. 2002.

Lazarewicz, M.L. et al., "Grid Frequency Regulation by Recycling Electrical Energy in Flywheels," Beacon Power, 5 pages, 2004.

Lazarewicz, M.L. et al., "Status of Pilot Projects Using Flywheels for Frequency Regulation," IEEE, 3 pages, 2006.

Lu, C.F. et al., "Effect of Battery Energy Storage System on Load Frequency Control Considering Governor Deadband and Generation Rate Constraint," IEEE Transactions on Energy Conversion, vol. 10, No. 3, pp. 555-561, Sep. 1995.

Lyons, P., "Energy Storage for Power Systems with Rapidly Changing Loads," pp. 1-112 Purdue University, available at http://docs.lib.purdue.edu/cgi!viewcontent.cgi?article-1266&context=ecetr, Dec. 2002.

Mack, D.R., "Something new in power technology," IEEE Potentials, pp. 40-42, Apr. 1993.

Makansi, J. et al., "Energy Storage: The Missing Link in the Electricity Value Chain," Energy Storage Council, 23 pages, May 2002.

McElligott, S., "Flywheels Set to Help Regulate Frequency on the U.S. Grid," TechSurveillance Magazine, Cooperative Research Network, 7 pages, Nov. 2010.

Mrugowsky, H. et al., "Investigation of the stability of a 600 MJ energy storage system based on paralleled flywheel generators," presentation, EESAT 2002 Conference, 25 pages, Apr. 2002.

Rabenhorst, D.W. et al., "Low-Cost Flywheel Demonstration Program," The Johns Hopkins University, Applied Physics Laboratory, 108 pages, Apr. 1980.

Ribeiro, P.F. et al., "Energy Storage Systems for Advanced Power Applications," Proceedings of the IEEE, vol. 89, No. 12, pp. 1744-1756, Dec. 2001.

Richey, S., "Cleansource2 Battery-Free Energy Storage Theory Of Operation," Active Power, EESAT 2002 Conference, 5 pages, 2002.

Richey, S., "Cleansource2 Battery-Free Energy Storage Theory Of Operation," presentation, Active Power, EESAT 2002 Conference, 22 pages, 2002.

Sasaki, T. et al., "Study on Load Frequency Control Using Redox Flow Batteries," IEEE Transactions on Power Systems, vol. 19, No. 1, pp. 660-667, Feb. 2004.

Sears, J.R., "TEX: The Next Generation of Energy Storage Technology," IEEE, 11-3, pp. 218-222, 2004.

Sen, U., "Battery Energy Storage for Load Frequency Control of an Interconnected Power System," Delhi Technological University, 73 pages, Jun. 2011.

Symons, P.C., "Opportunities for Energy Storage in Stressed Electricity Supply Systems," IEEE, pp. 448-449, 2001.

Tarrant, C., "Revolutionary flywheel energy storage system for quality power," Power Engineering Journal, pp. 159-163, Jun. 1999.

Townley, D., "Introducing Pentadyne Power Flywheel Energy Storage System," Pentadyne Power Corporation, EESAT 2002 Conference, 4 pages, Apr. 2002.

Townley, D., "Performance and Application of the Pentadyne Flywheel System," presentation, Pentadyne Power Corporation, EESAT 2002 Conference, 24 pages, Apr. 2002.

Van Der Linden, S., "The Commercial World of Energy Storage: A Review of Operating Facilities," presentation, 1st Annual Conference of the Energy Storage Council, 51 pages, Mar. 2003.

Wagner, R. et al., "Flywheel Technology Development At The NASA Glenn Research Center," University of Toledo, NASA Glenn Research Center, EESAT 2002 Conference, 6 pages, Apr. 2002.

Wagner, R. et al., "Flywheel Technology Development At The NASA Glenn Research Center," presentation, University of Toledo, NASA Glenn Research Center, EESAT 2002 Conference, 17 pages, Apr. 2002.

English Language Abstract of Japanese Patent Publication No. 06-284583 A, Japanese Patent Office, Patent Abstracts of Japan, Oct. 1994.

Office Action for corresponding Mexican Patent Application No. MX/a/2012/014398, 3 pages.

Notice of Allowance for corresponding Mexican Patent Application No. MX/a/2012/014398 with English translation of the claim set, 6 pages.

Office Action for corresponding Japanese Patent Application No. JP2013-513502 with English translation—"Notification of Reasons for Refusal," 6 pages.

First Office Action for corresponding Chinese Patent Application No. 201180035118.2 with English translation—"Notification of the First Office Action," 25 pages.

Second Office Action corresponding Chinese Patent Application No. 201180035118.2 with English translation—"Notification of the Second Office Action," 8 pages.

Third Office Action for corresponding Chinese Patent Application No. 201180035118.2 with English translation—"Notification of the Third Office Action," 23 pages.

* cited by examiner

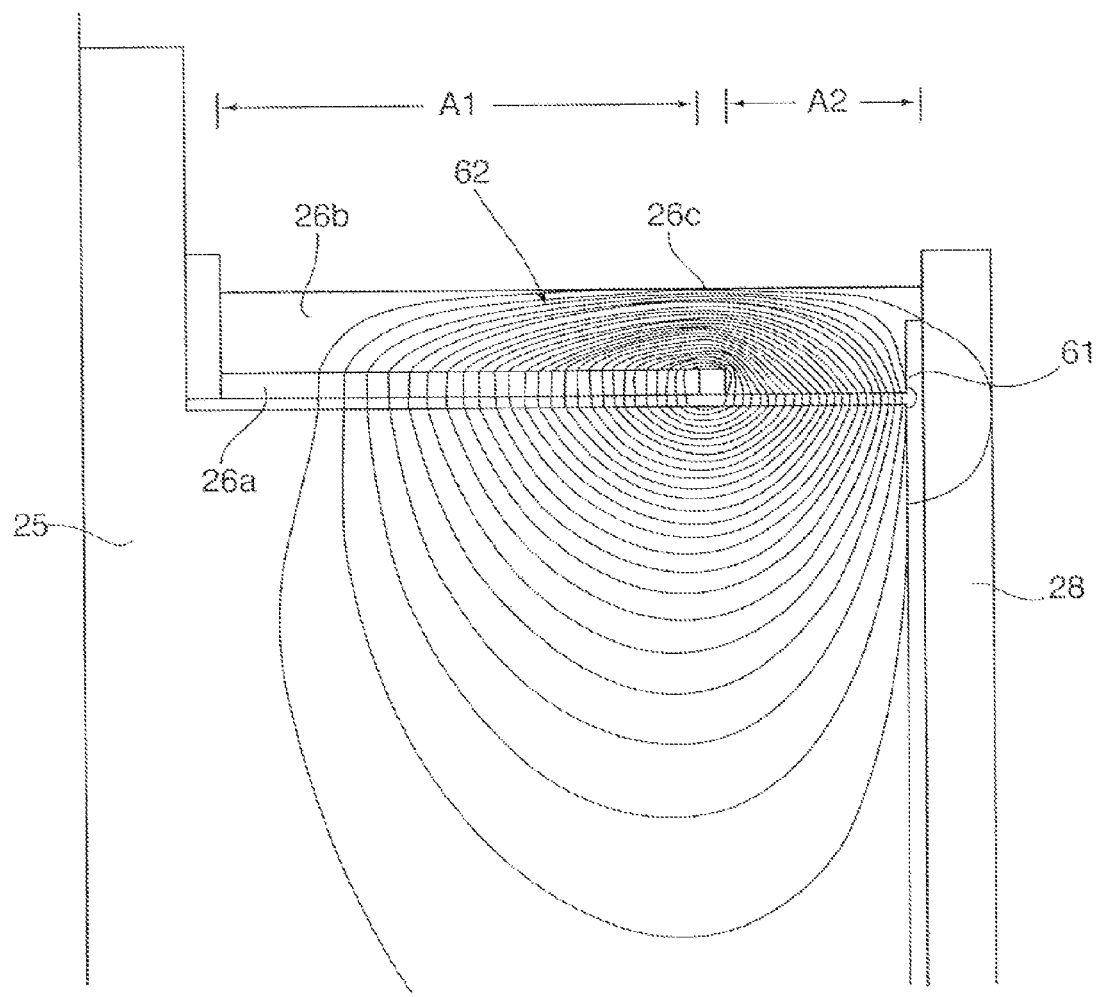

FLYWHEEL ENERGY SYSTEM

CROSS REFERENCE TO RELATED APPLICATIONS

This application claims priority from U.S. Provisional Application No. 61/352,810 filed on Jun. 8, 2010, the contents of which are incorporated herein by reference.

FIELD OF THE INVENTION

The present invention relates to energy storage systems, and more specifically to energy storage systems capable of storing electrical energy as kinetic energy of a rotating flywheel, for release of the stored kinetic energy as electrical energy when required.

DESCRIPTION OF THE PRIOR ART

Large-scale energy storage has the potential to solve many challenges related to modernizing electrical power distribution. Some of these challenges include managing intermittent renewable energy generation, electricity load shifting, blackstart capabilities, managing electricity price fluctuations, and back-up power supply.

Currently, there are several large-scale energy storage technologies that attempt to address the challenges facing the energy storage industry. These technologies include advanced batteries, electrochemical capacitors (EC), pumped hydro, compressed air energy storage, and flywheel technologies.

With respect to the advanced batteries technologies, one such technology—the lead acid battery, has been a popular choice for power quality and UPS applications due to the low cost associated with such batteries. However, the effectiveness of lead acid batteries for large-scale applications is limited by the very short life cycle of such batteries, and the variable discharge rate. Li-ion batteries are often seen as an alternative or replacement for lead acid batteries because of their much longer life cycle. Development of the Li-ion battery has been driven to date primarily by the automobile industry, with potential applications for vehicular, residential and commercial use. The effectiveness of Li-ion batteries as suitable energy-storage technology is, however, limited by the high cost associated with the manufacture of such batteries, and by security concerns associated with large-scale implementations of Li-ion batteries. Metal-Air batteries are the most compact and potentially the least expensive battery to manufacture. However, the effectiveness of Metal-Air batteries is limited by the very short life cycle and low efficiencies (e.g., approximately 50%) of such batteries. One particular battery technology that has shown promise as a solution for large-scale implementations is the sodium-sulphur (NaS) battery technology. NaS batteries have high energy density but require high operating temperatures and have a relatively short life span. The above-identified battery technologies typically have an average AC to AC round-trip efficiency of approximately 64%. Moreover, electrochemical battery technology, in general, have a usable life that is degraded by the number of charge/discharge cycles.

Electrochemical capacitors (EC) are also used as an energy storage solution. ECs are energy storage devices that have longer life cycles and are more powerful than lead-acid batteries. However, it is not feasible to implement ECs on large-scale projects due to their high cost and low energy density.

A potential solution to large-scale implementations of energy storage technology is pumped hydro. Conventional pumped hydro uses two water reservoirs, which are separated vertically and thus have an energy potential associated with the energy of the water travelling from the elevation of higher potential energy to the elevation of lower potential energy by means of gravity. During off-peak hours, electrical power is used to pump water from the lower reservoir to the upper reservoir. As demand for electrical energy increases, the water flow is reversed to generate electricity. Pumped storage is the most widespread energy storage system in use on power networks. The main applications for pumped hydro are energy management and frequency control. The main drawbacks associated with pumped hydro are the unique site requirements and the large upfront capital costs.

Another potential energy-storage solution is compressed air energy storage (CABS). CAES uses a combination of compressed air and natural gas. A motor pushes compressed air into an underground cavern at off-peak times. During on-peak times, compressed air is used in combination with gas to power a turbine power plant. A CAES uses roughly 40% as much gas as a natural gas power plant. A CAES has similar wide-scale use limitations as pumped hydro: the site locations and large upfront capital costs.

Another proposal for large-scale energy storage implementations is flywheel energy storage systems, which have emerged as an alternative to the above-identified energy storage technologies. Such systems are currently used in two primary commercial applications: uninterruptible power supply (UPS) and power frequency regulation (FR). Both UPS and FR require extremely quick charge and discharge times that are measured in seconds and fractions of seconds. Flywheel technologies have many advantages over other energy storage technologies, including higher reliability, longer service life, extremely low maintenance costs, higher power capability, and environmental friendliness. Flywheel energy storage systems store energy in a rotating flywheel that is supported by a low friction bearing system inside a housing. A connected motor/generator accelerates the flywheel for storing inputted electrical energy, and decelerates the flywheel for retrieving this energy. Power electronics maintain the flow of energy into and out of the system, to mitigate power interruptions, or alternatively, manage peak loads. Traditional flywheel designs limit their use to the above mentioned short duration applications due to high electrical parasitic losses associated with electromagnetic bearing systems.

One way to support a flywheel for rotation at high speeds is with rolling element mechanical bearing assemblies such as ball bearing assemblies. The life of such mechanical bearing assemblies is strongly influenced by the loads that such mechanical bearing assemblies must carry. In order to extend the life of flywheel energy storage systems using mechanical bearing assemblies, a magnetic bearing can be used in combination with the mechanical bearings for the purpose of reducing the load on the mechanical bearings. In such an example, the rotor portion of the flywheel typically rotates about a vertical axis and the mechanical bearing assemblies provide radial support while the magnetic bearing assembly carries or supports the axial load of the flywheel. Traditionally, flywheel designs have utilized electromagnetic thrust bearings for this purpose.

U.S. Pat. No. 6,710,489, issued Mar. 23, 2004, (hereinafter "Gabrys I") discloses the use of a plurality of magnetic bearing assemblies that are used to support axially the flywheel rotor portion. Such a flywheel energy storage system also has multiple mechanical bearing assemblies which each provide radial support for the flywheel rotor portion, but do not axially restrain the flywheel rotor portion. The design of such a system having mechanical bearing assemblies that are unrestrained axially substantially ensures that the entire axial load of the flywheel or rotor is distributed on the magnetic bearings, thus reducing the wear on the mechanical bearing assemblies. In this manner, such a flywheel rotor portion effectively "floats". The systems of Gabrys I utilize magnetic bearings to locate the rotor axially, either repulsive bearings for passive (permanent) magnets, or attractive bearings for actively controlled electro magnets. Where attractive bearings are used, a control system is required to adjust the axial location of the flywheel by adjustment of the attractive force. Such systems are relatively complex and absorb significant power while in operation thus limiting their use to short duration applications.

U.S. Pat. No. 6,806,605, issued Oct. 19, 2004, (hereinafter "Gabrys II") also discloses the use of magnetic bearings for supporting rotating objects. More specifically, Gabrys II discloses a permanent magnetic thrust bearing with an electromagnetic radial magnetic bearing having a rotating portion with a circumferential multi-piece construction. This electromagnetic radial magnetic bearing provides radial stiffness, which is desirable because applications wherein a flywheel will be rotating at high speeds require that the flywheel be rotating true to its rotational axis. Thus, Gabrys II discloses a flywheel energy storage system which uses magnetic forces to produce (i) axial forces that suspend the flywheel, and (ii) radial forces that centre or stabilize the flywheel in an effort to maintain a true axis of rotation. Gabrys II further discloses a flywheel system wherein the flywheel is axially and radially supported by means of repulsive magnetic forces that generate a thrust that purportedly maintains a stable levitation of the flywheel. Repulsive magnetic forces generated from permanent magnets are known to degenerate over time; and accordingly there is the possibility of mechanical failure of the device.

A paper entitled Low Cost Energy Storage for a Fuel Cell Powered Transit Bus, authored by CS Hearn describes a flywheel structure in which passive lift magnets are used to reduce the axial loads on mechanical bearings. The mechanical bearings axially locate the rotor of the flywheel. The magnetic path resulting from the structure shown in Hearn is relatively dispersed, which, together with the mechanical bearing arrangement disclosed, provides a relatively inefficient support system.

It is therefore an object of the present invention to obviate or mitigate the above disadvantages.

SUMMARY OF THE INVENTION

In accordance with one aspect of the present invention there is an energy storage system comprising:
a) a first housing having an end face;
b) at least one flywheel having a drive shaft, a rotor rotatable with said drive shaft and having ferromagnetic properties, said drive shaft defining a substantially vertical axis about which the rotor is mounted for rotation within the first housing;
c) a magnetic bearing assembly juxtaposed between said end face and said rotor, said magnetic bearing assembly having at least one permanent magnet mounted on one of the first housing and said rotor to attract said rotor axially upwardly towards said end face to at least partially support the weight of said flywheel;
d) a first mechanical bearing assembly acting between said first housing and said rotor to provide radial positioning of said rotor and to limit at least upward axial movement of the rotor in relation to said end face such that a minimum clearance gap is defined between said end face and the rotor; and e) a second mechanical bearing assembly spaced from said first bearing assembly along said drive shaft and acting between said first housing and said rotor to provide radial positioning of said rotor, said second mechanical bearing assembly permitting relative axial movement between said shaft and said housing.

Preferably the permanent magnet is secured to the end face.

Preferably, said one mechanical bearing assembly also limits downward axial movement of the rotor portion in relation to the lower face such that a maximum clearance gap is further defined between the lower face and the rotor portion.

According to a further aspect of the present invention there is provided an energy storage system comprising:
a) a first housing having an end face;
b) at least one flywheel having a drive shaft, a rotor rotatable with said drive shaft and having ferromagnetic properties, said drive shaft defining a substantially vertical axis about which said rotor is mounted for rotation within the first housing;
c) a magnetic bearing assembly juxtaposed between said end face and said rotor, said magnetic bearing assembly having at least one annular permanent magnet mounted on one of the first housing and said rotor to attract said rotor axially upwardly towards said end face to at least partially support the weight of said flywheel; and,
d) at least one mechanical bearing assembly mounted within the first housing about the drive shaft to provide radial positioning of said rotor and to limit at least upward axial movement of the rotor portion in relation to said lower face such that a minimum clearance gap is defined between said end face and said rotor, said end face and said rotor extending radially beyond said permanent magnet to establish a flux path between said housing and said rotor.

BRIEF DESCRIPTION OF THE DRAWINGS

Embodiments of the invention will now be described by way of example only, with reference to the accompanying drawings, in which.

FIG. 7b is a cross-sectional view along sight line 7B-7B of FIG. 7a.

FIG. 8 is a plot of an area of FIG. 4, illustrating the circular magnetic flux pattern created by the magnetic thrust bearing assembly.

DETAILED DESCRIPTION OF THE INVENTION

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

Figure 1:
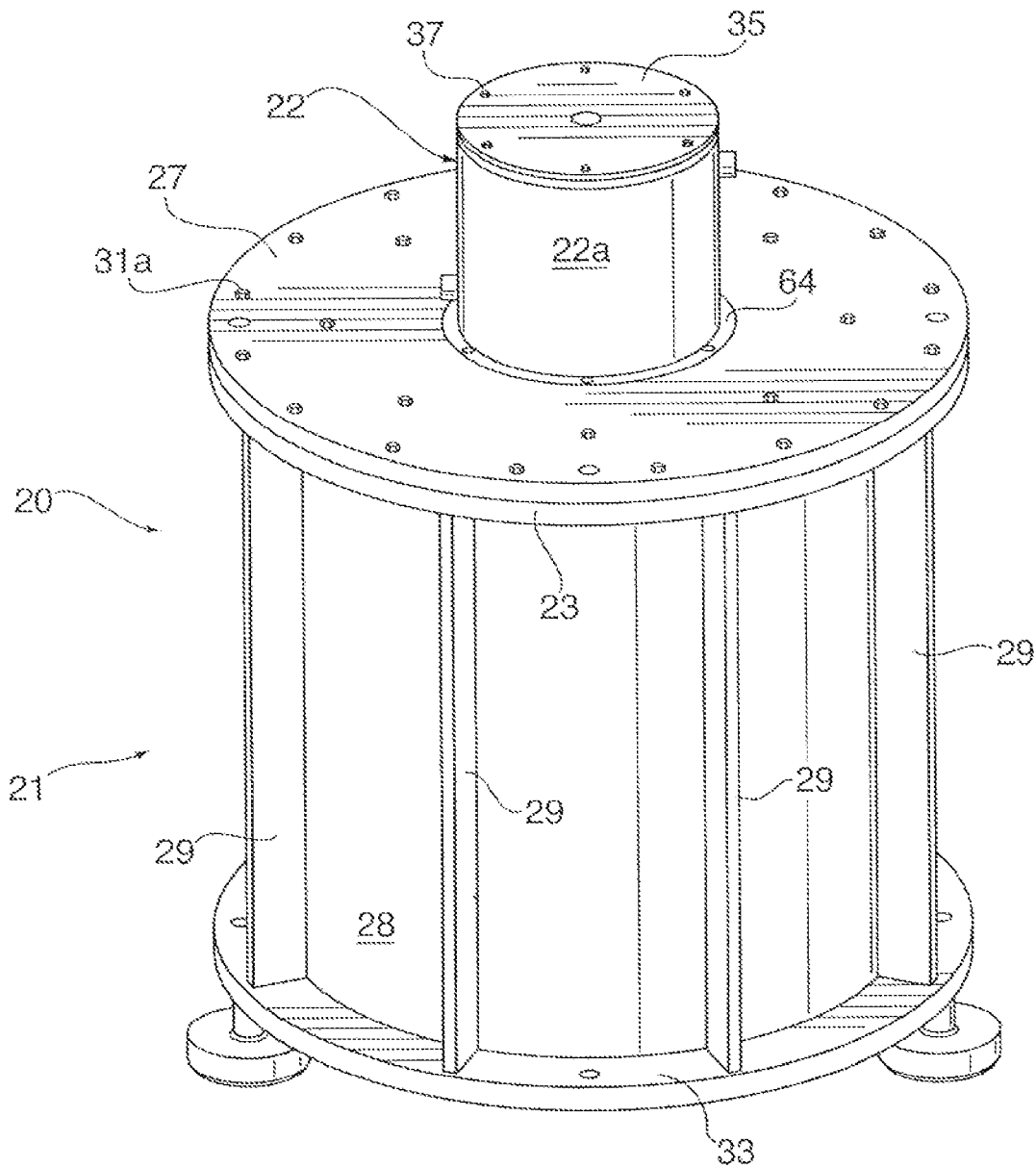
FIG. 1 is a front perspective view of an energy storage system.

FIG. 1 is a perspective view of an energy storage system 20 that is constructed as a modular system having two major components: a first housing 21 containing a flywheel (not visible in FIG. 1) rotatably mounted therein as will be described more fully below, and a second housing 22 releasably mounted atop the first housing 21. The second housing 22 contains a motor/generator (not visible in FIG. 1) coupled to the flywheel to either drive the flywheel or be driven by the flywheel, upon operation of the system in a manner that will become more apparent as description unfolds.

As best seen in FIG. 1, the first housing 21 has a cylindrical outer wall 28 that terminates at its upward extent in a radially outwardly projecting peripheral flange 23, and is closed at it lower extent by an annular base plate 33. The base plate 33 preferably projects beyond the cylindrical outer wall 28 a radial distance substantially equal to that of the peripheral flange 23. The cylindrical outer wall 28 is reinforced at regular intervals around its circumference by a plurality of spaced vertical ribs 29, which extend between the base plate 33 and the radially outwardly projecting peripheral flange 23. The first housing 21 is closed adjacent its opposite, upper end by means of an annular top plate 27, which is releasably affixed to the radially outwardly projecting peripheral flange 23 by a plurality of circumferentially spaced machine screws 31a. Each machine screw 31a engages a corresponding plurality of complimentary threaded bores 31b (see FIG. 2) formed in the radially outwardly projecting peripheral flange 23. The housing thus formed is of rigid and robust construction, suitable to contain the flywheel.

In the embodiment shown, the second housing 22 is formed with a cylindrical outer wall 22a (of smaller diameter than the cylindrical outer wall 28 of the first housing 21), which cylindrical outer wall 22a terminates at its lower extent in a radially outwardly projecting peripheral flange 64. The second housing 22 is closed adjacent its upper end by a cylindrical top plate 35 attached to the cylindrical outer wall 22a by means of, for example, a plurality of machine screws 37, arranged around the periphery of the top plate 35 and received in complimentary threaded bores (not shown) formed in the upper edge of the cylindrical outer wall 22a.

It is preferred that the housings 21, 22 are formed from non-ferromagnetic materials. Non-ferromagnetic materials are especially preferred for this purpose to minimise the magnetic drag that slows down the flywheel's rotation and lessens the time the motor/generator is available for energy release during a discharge cycle. Suitable materials may be selected from a group including, but not limited to, stainless steel, aluminum, plastics, fibreglass, concrete, and combinations thereof, which materials may also be reinforced with composite materials, including, but not limited to, carbon fibre, Kevlar™, or the like.

Figure 2:
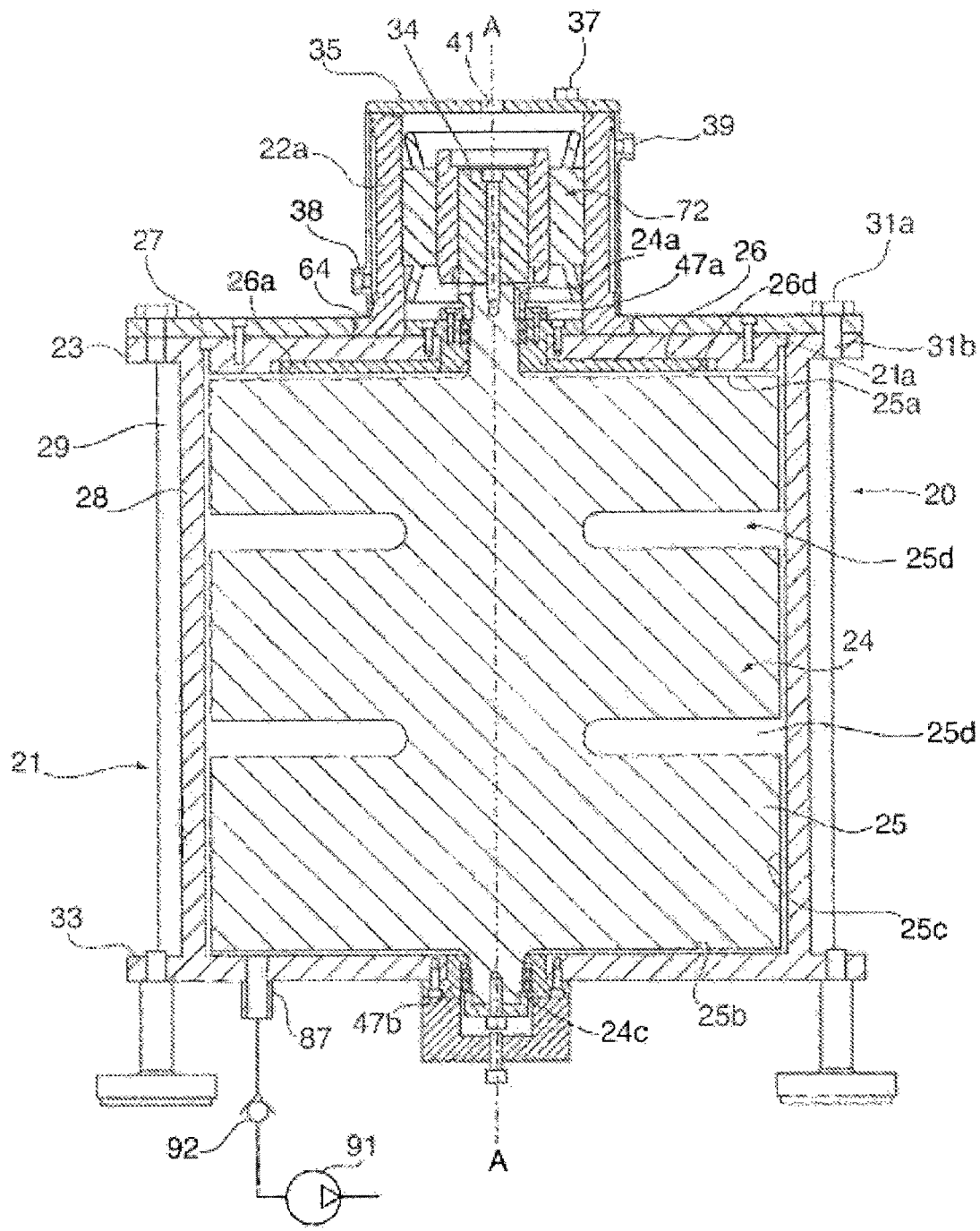
FIG. 2 is a cross-sectional view along the line II-II of FIG. 1.
Figure 3:
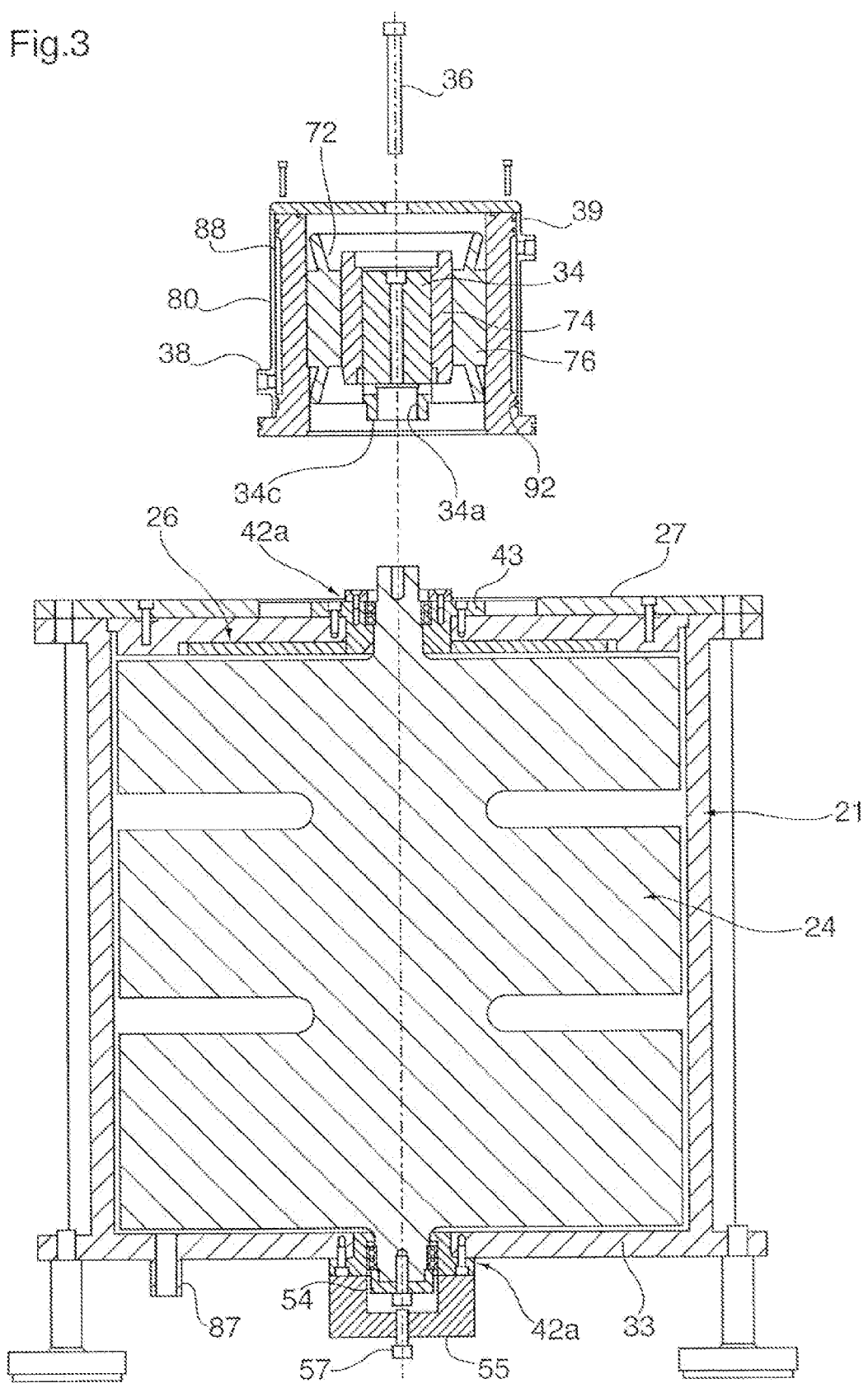
FIG. 3 is a view similar to that of FIG. 2, in a partly disassembled state.
Figure 3A:
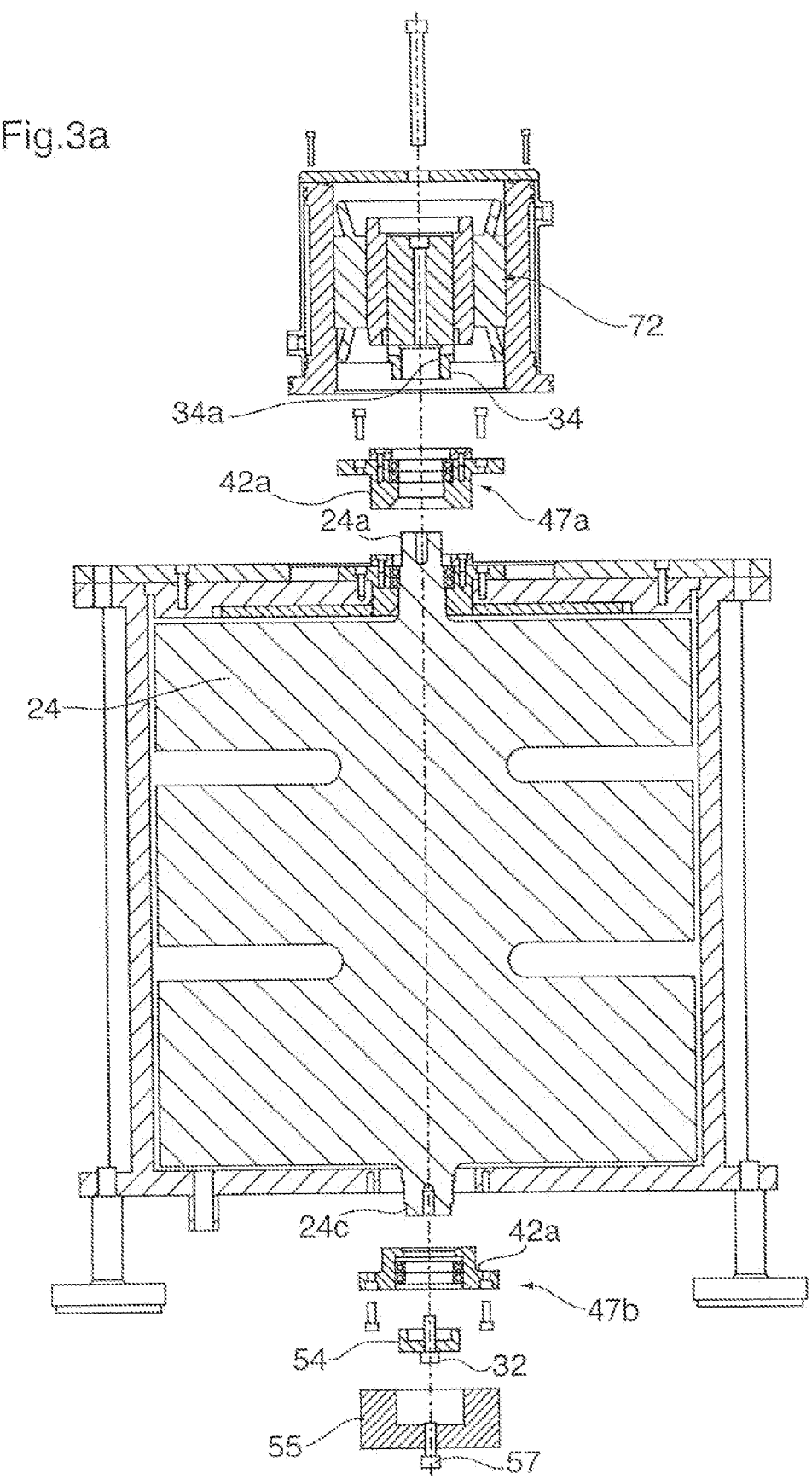
FIG. 3a is a view similar to FIG. 3 further disassembled.

As can be seen in FIGS. 2 and 3, the first housing 21 contains a flywheel 24 that is supported for rotation within the housing 21 on bearing assemblies 47a, 47b. The flywheel 24 includes a rotor 25 and an upper drive shaft segment 24a and lower drive shaft segment 24c segment. The rotor 25 and drive shaft segments 24a, 24c are integrally formed from a forged blank. The rotor 25 is cylindrical with its axis aligned with drive shaft segments 24a, 24c. The diameters of the drive shaft segments 24a, 24c may differ due to the different loads applied. The drive shaft segments 24a, 24c together define a substantially vertical axis A about which the rotor 25 is mounted for rotation within the first housing 21 in a manner that will be described in more detail below. Rotor 25 has an upper planar end surface 25a and lower planar end surface 25b with a peripheral surface 25c extending between the upper and lower planar surfaces. A pair of radial grooves 25d are formed between the end faces 25a, 25b to facilitate heat transfer during manufacture. While the first housing 21 may be sized and otherwise constructed to accommodate more than one flywheel rotating therein, in the preferred embodiment illustrated, a single flywheel 24 is shown, as this is the simplest to illustrate and describe, and, as will become more apparent as this description proceeds, the preferred arrangement readily supports ordered and regular modular expansion of the subject energy storage system by adding further flywheels, one at a time, with each contained within a respective first housing 21.

It will also be appreciated that while a solid rotor 25 and drive shaft 24a, 24b has been described, a fabricated rotor with separate drive shaft segments may be used. Alternatively, a separate drive shaft extending through the rotor 25 and attached thereto for driving rotation thereof could be used.

The rotor 25 is made from a material having ferromagnetic properties, such as, for example, high density steel. In alternate embodiments, other ferromagnetic materials from which the rotor 25 may be manufactured are iron, nickel, cobalt, and the like. The higher the mass of the rotor 25, the greater the kinetic energy the energy storage system 20 is able to store at the same RPM of the flywheel. In contrast, the higher the mass of the rotor 25, the greater the potential frictional losses that can occur through the mechanical bearings used to mount same for rotation, and the greater the need for precision engineering and robustness of the system in order to prevent potentially dangerous accidents through component failure at high RPMs.

It will be appreciated that the rotor 25 may be made as a composite structure with part ferromagnetic materials if preferred, and may be shaped other than cylindrical, provided it is balanced for high speed rotation. A cylindrical, steel rotor appears to be the most economical.

The preferred embodiment illustrated in FIGS. 1 to 5 further comprises a magnetic thrust bearing assembly 26 that acts between the housing 21 and flywheel 24 to support a significant portion of the weight of flywheel 24 thus relieving the mechanical bearing assemblies 47 of axial loading. The magnetic thrust bearing assembly 26 has at least one annular permanent magnet 26a that is mounted on the first housing 21, as described more fully below. During operation of the preferred embodiment, the annular permanent magnet 26a remains fixed, and does not rotate, thereby providing a very stable support mechanism for the flywheel 24 which lies beneath. The magnetic thrust bearing assembly 26, and more specifically, the annular permanent magnet 26a, is mounted on the first housing 21 in stationary centred relation about the vertical axis A, so as to be juxtaposed with end face 25a of the rotor 25. The annular permanent magnet 26a may be constructed as a unitary annulus having a single layer of ferromagnetic metal material, as shown in FIGS. 2 through 6C, or may vary in its construction, as discussed further below.

As the rotor 25 is made from a ferromagnetic material, the positioning of the permanent magnet above the end face 25a attracts the rotor 25 axially upwardly towards a lower face 26d of the annular permanent magnet 26a. The attractive magnetic forces between the annular permanent magnet 26a and the rotor 25 at least partially, and ideally, totally, support the weight of the flywheel 24.

Figure 4:
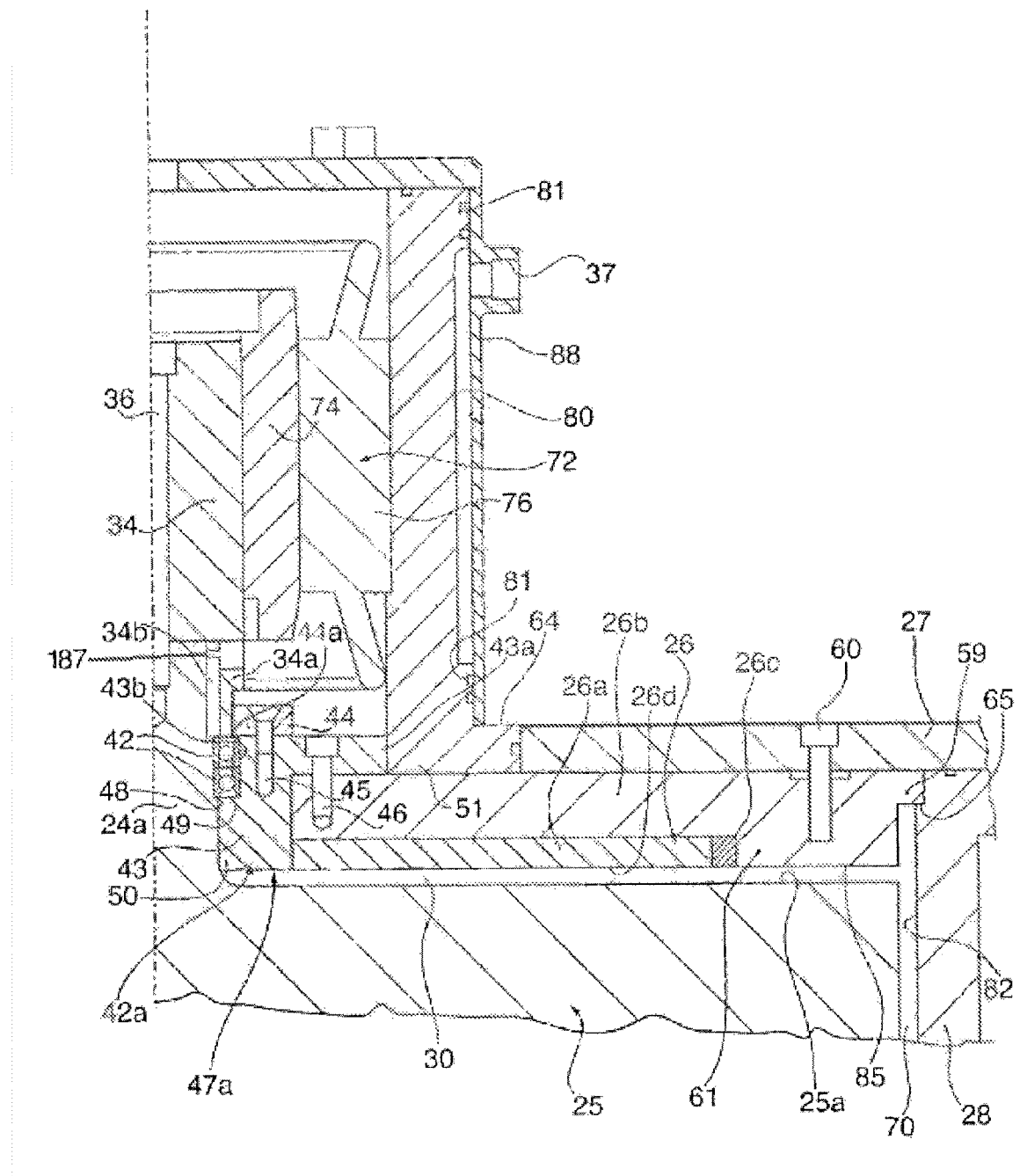
FIG. 4 is an enlarged view of an upper portion of FIG. 2.

As best seen in FIGS. 2 through 4, magnetic thrust bearing assembly 26 comprises annular permanent magnet 26a, together with an annular backing plate 26b and a non-magnetic spacer ring 26c composed of a non-ferrous metal material, or a polymer, such as "REANCE F65"—a flexible neodymium iron boron magnet—manufactured by The Electrodyne Company, Batavia, Ohio. The annular backing plate 26b is constructed from a ferromagnetic metal, and is mounted to the underside or end face 21a of the annular top plate 27 of the first housing 21, also in stationary centered relation about the vertical axis A. A plurality of machine screws 60 engages corresponding threaded bores formed in the annular backing plate 26b to secure the backing plate 26b to the top plate 27. The annular backing plate 26b extends radially beyond the outer radial edge of the annular permanent magnet 26a, and beyond the outer radial edge of the non-magnetic spacer ring 26c, to form a downwardly projecting perimeter skirt portion 61. The downwardly depending perimeter skirt portion 61 preferably has an outer radius at least equal to the radius of the rotor 25, with the non-magnetic spacer ring 26c interposed between the outer radial edge of the annular permanent magnet 26a and the inner radius of the downwardly depending perimeter skirt portion 61. The annular backing plate 26b preferably has a shoulder portion 59 arranged around its outer circumferential edge, which rests in close-fitting nested relation upon a complimentary internal annular ledge 65 formed adjacent to the upper edge of the cylindrical outer wall 28 of the first housing 21.

To enhance the support of the rotor 25, the magnetic bearing 26 is configured to constrain the flux path through the rotor 25. The perimeter skirt portion 61 has a lower face 85 that is vertically substantially co-terminus with the lower face 26d of the annular permanent magnet 26a, thereby to also maintain the same minimum clearance gap 30 between the rotor 25 and the lower face 85 of the perimeter skirt portion 61. The perimeter skirt portion 61 helps shape the magnetic field and thus contributes to the inherent stability of the rotor 25 while it rotates during operation of the energy storage system. With the arrangement shown, the annular permanent magnet 26a, the annular backing plate 26b, the non-magnetic spacer ring 26c, and the perimeter skirt portion 61 constrain the magnetic flux field to enhance the support capacity of the bearing 26.

The annular permanent magnet 26a of FIGS. 2 through 5 is preferably affixed to the annular backing plate 26b by magnetic attraction thereto, and such affixation may be supplemented by the use of low out-gassing adhesive, such as HS-4 Cyanoacrylate Adhesive manufactured by Satellite City, Simi Valley, Calif., or an epoxy.

In the embodiment shown in FIGS. 1-5, the annular permanent magnet 26a is shown as being formed as a unitary, rigid structure of conventional magnetized metal, rare earth metal, or the like. In alternative embodiments, the annular permanent magnet 26a may, instead, be formed from one or more sections or layers of magnetic material. This provides, in most cases, for easier and less costly fabrication. For example, the annular permanent magnet 26a may be fabricated from a flexible magnetic material, such as rare earth magnetic particles mixed with a polymer binder (such as is used in the construction of conventional fridge magnets). In one such alternative embodiment, shown in FIGS. 6a through 6c, a single layer of such flexible permanent magnetized material may be formed from this material in a series of concentric circles 26e of widening radius wrapped around the vertical axis A in a radially expanding manner. The magnetic poles of the layer of flexible magnetic material are aligned in the same direction, and preferably run in parallel relation to the vertical axis A, as shown by the arrows in FIG. 6c.

Figure 7A:
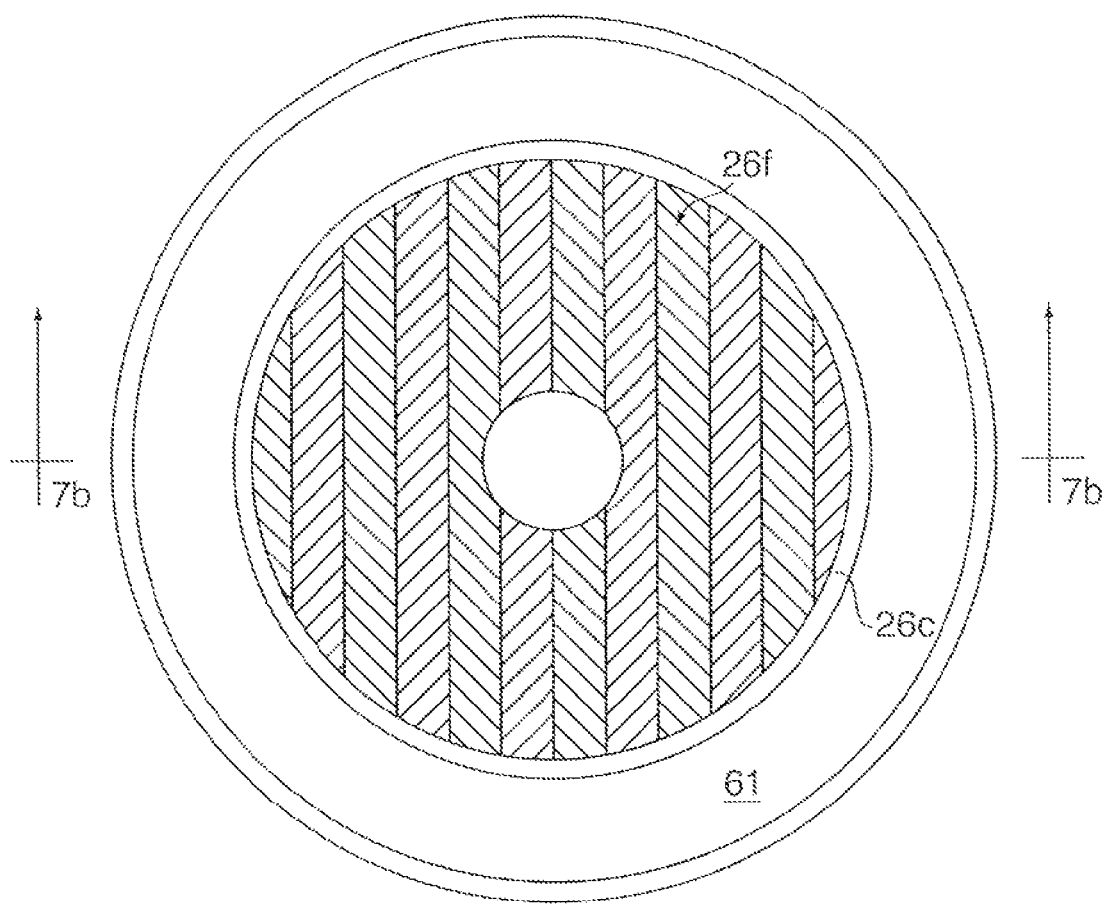
FIG. 7a is bottom plan view of a second alternative embodiment of magnetic thrust bearing assembly.
Figure 7B:
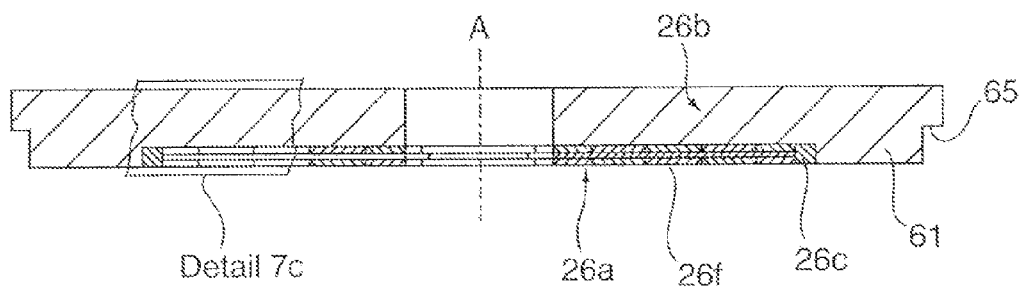
Figure 7C:
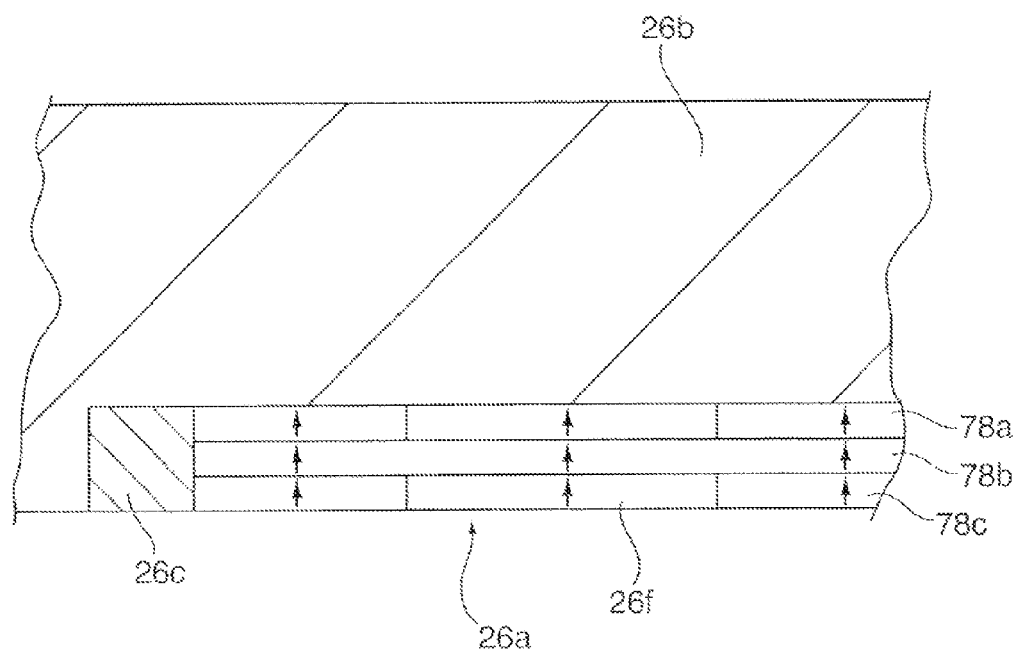
FIG. 7c is a and enlarged view of the encircled area 7C of FIG. 7b.

In a further alternate embodiment (shown in FIGS. 7a through 7c), the annular permanent magnet 26a can be built up from a plurality of patches 26f of the aforesaid flexible magnetic material laid in a regular patchwork array having one or more layers positioned one above the other. As shown in FIGS. 7a through 7c, the patchwork may be of rectangular strips (1.5"×0.125"), and the plurality of layers shown is three layers 78a, 78b, and 78c. It will again be noted from FIG. 7c that the magnetic poles of each of the layers 78a, 78b, and 78c of flexible magnetic material are aligned in the same direction, preferably running in parallel relation to the vertical axis A. Patches of flexible magnetic material of other shapes and sizes, for example, square patches, may be substituted for the rectangular patches shown in FIGS. 7A through 7C, and the number of layers utilized in a particular installation will vary according to the strength required to support the target percentage of weight of the flywheel 24 to be carried by the magnetic thrust bearing assembly 26 in that particular application.

Similar forms of affixation may be used for each layer of permanent magnet material illustrated in the alternate embodiments illustrated in FIGS. 6a through 6c and 7a through 7c as were previously described in relation to the embodiment of FIGS. 1 through 5.

Although the permanent magnet could be formed on the upper surface of the rotor 25, the stationary mounting of the magnet 26a permits the use of such flexible permanent magnetic material in the construction of a magnetic thrust bearing assembly 26. Such flexible magnetic material is too soft and fragile to sustain high speed rotation (i.e., above 1,000 RPMs, and more typically above 10,000 RPM) for prolonged periods of time, particularly where it to is circumferentially wrapped or laid in a layered array. By reason of the high centrifugal forces exerted thereon during high speed rotation the material would be subject to radial distortion, and possible rupture or de-lamination.

As illustrated in FIGS. 2 through 4, an electrical rotary machine that may function as a motor or generator, referred to as a motor/generator 72 is releasably coupled to the upper drive shaft segment 24a by means of a coupling shaft 34. The shaft 34 has an annular collar 34a that projects downwardly from the motor/generator 72 in order to provide for an axially slidable engagement with the upper drive shaft segment 24a. The collar 34a of coupling shaft 34 is releasably coupled to the upper drive shaft segment 24a by means of a bolt 36. A key 34b and mating keyway engage one another to operatively connect the coupling shaft 34 with the upper drive shaft segment 24a of the drive shaft for transfer of torque from the motor/generator 72 to the flywheel 24 (and vice versa). Alternatively, mating splines (not shown) may be used on the coupling shaft 34 and the upper drive shaft segment 24a, respectively, in place of the key and keyway illustrated.

The upper mechanical bearing assembly 47a is mounted within a top portion of the first housing 21, about the upper drive shaft segment 24a. The upper mechanical bearing assembly 47a provides axial positioning of the rotor 25 in order to limit at least upward axial movement of the rotor 25 in relation to the lower face 26d of the annular permanent magnet 26a. More particularly, the upper mechanical bearing assembly 47a limits the upward axial movement of the rotor 25 so as to define a minimum clearance gap 30 between the lower face 26d of the annular permanent magnet and the end face 25a of rotor 25. The upper mechanical bearing assembly 47a may also be preferably configured to limit downward axial movement of the rotor 25 in relation to the lower face 26d of the annular permanent magnet. In this regard, the upper mechanical bearing assembly 47a is preferably a thrust bearing. This configuration allows the upper mechanical bearing assembly 47a to further define a maximum clearance gap 30 between the lower face of the annular permanent magnet and the rotor 25, which maximum gap 30 is equal to the minimum clearance gap 30 in the preferred embodiment illustrated. Restraining movement of the upper mechanical bearing assembly 47a in both axial directions assures that the gap 30 maintained between the lower face 26d of the annular permanent magnet and the rotor 25 is within operative tolerances, thereby assuring reliable lift by the annular permanent magnet 26a of the rotor 25.

As best seen in FIG. 4, the upper drive shaft segment 24a has a precision ground bearing support that terminates at a shoulder 48. The upper mechanical bearing assembly 47a is preferably comprised of two rolling element bearing sets 42 contained within a removable bearing cartridge 42a to facilitate the quick and easy replacement of worn or damaged bearing assemblies. The rolling element bearing sets 42,42 are both preferably ceramic angular contact ball bearing sets, and most preferably very high speed, super precision, hybrid ceramic bearing sets, meaning, the balls are comprised of ceramic material which run in precision ground steel races.

The cartridge 42a includes a bearing support housing 43, a bearing axial fixing ring 44 and machine screws 45 and 46. The support housing 43 has a radial flange 43a and a bearing recess 43b. The bearing sets 42 are located in the recess 43b and retained by the ring 44. The outer races of the rolling element bearing sets 42 are restrained axially between lower surface 44a of bearing axial fixing ring 44 and end face 49 the bearing recess 43b and the ring 44 secured by machine screws 45. The bearing support flange 43 is retained axially via machine screws 46 to the upper surface 51 of the annular backing plate 26b, which in turn is fixed to the annular top plate 27 of the first housing 21 as previously described.

The lower surface 34c of collar 34a of coupling shaft 34 bears against the inner races 42b of the rolling element bearing sets 42 and is secured by a bolt 36 that is received in the drive shaft 24a. The bolt 36 acts through the shaft 34 to apply a preload to the rolling element bearing sets 42 by adjustably compressing the inner races between the lower surface 34c of the coupling shaft 34 and bearing shoulder 48 of the upper drive shaft segment 24a.

The axial position of the bearing support flange 43 with respect to the magnetic thrust bearing assembly 26 fixes the axial position of the upper drive shaft segment 24a of the rotor 25, and maintains the substantially constant gap 30 between the top surface 25a of the rotor 25 and the lower face 26d of the magnetic thrust bearing assembly 26. The gap 30 is determinative to applying the correct lifting force to the rotor 25 and reducing the axial loading to the rolling element bearing set 42. The gap 30 may be adjusted by placing shims (not shown) at surface 51 to raise the bearing support flange 43, thereby lifting the rotor 25 and decreasing gap 30 to apply a greater magnetic lifting force.

Figure 5:
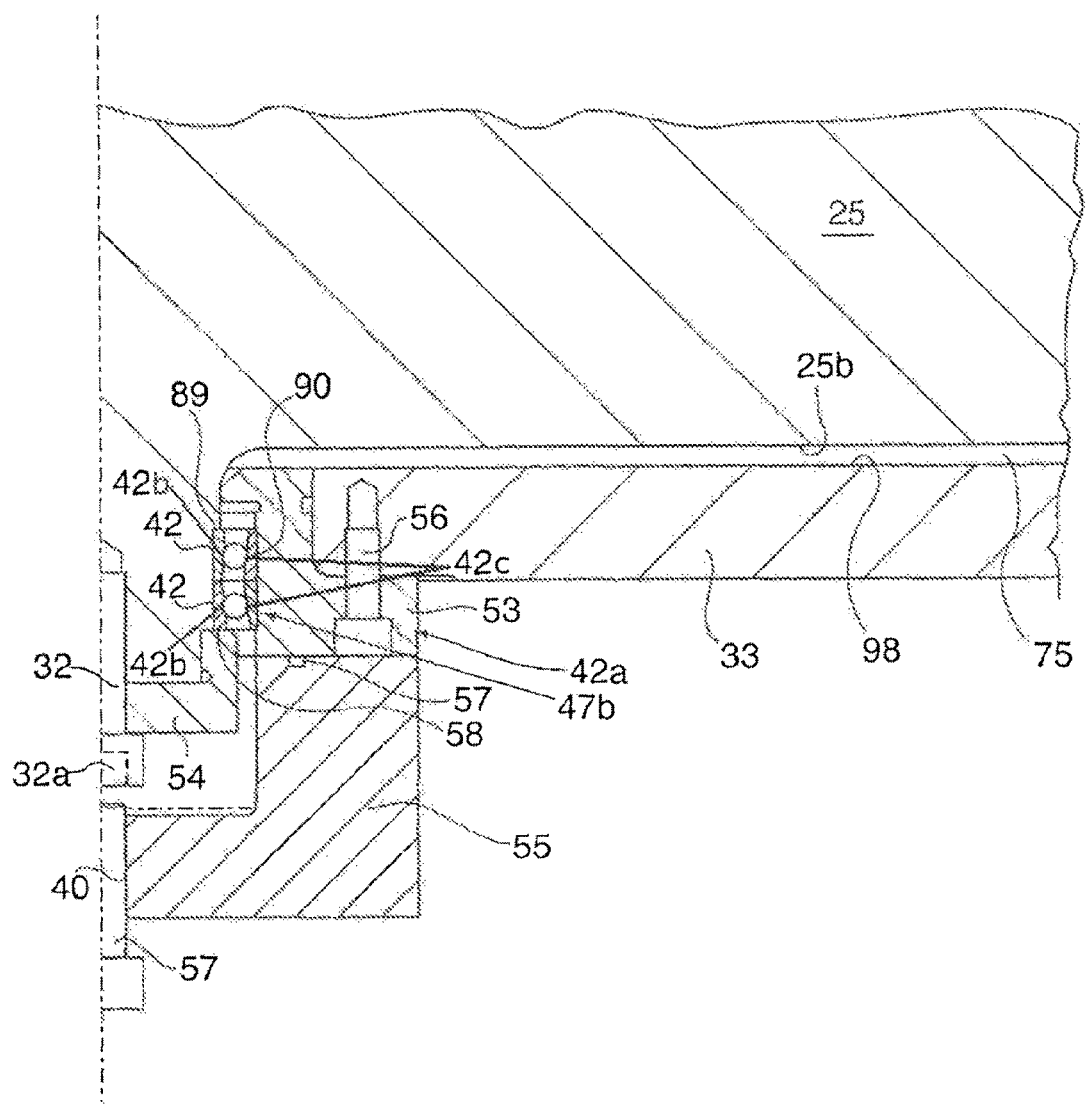
FIG. 5 is an enlarged view of a lower portion of FIG. 2.
Figure 6A:
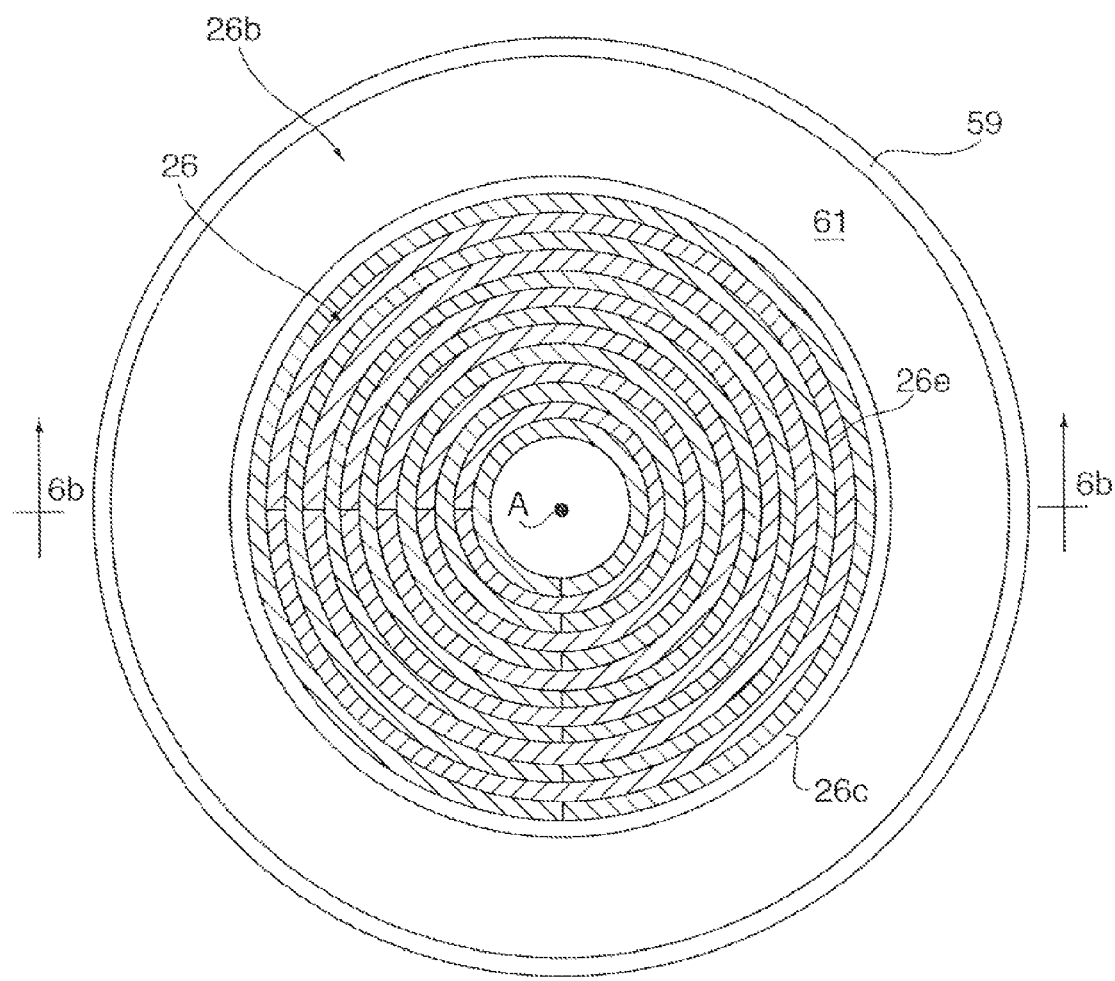
FIG. 6a is bottom plan view of a first alternative embodiment of magnetic thrust bearing assembly.
Figure 6B:
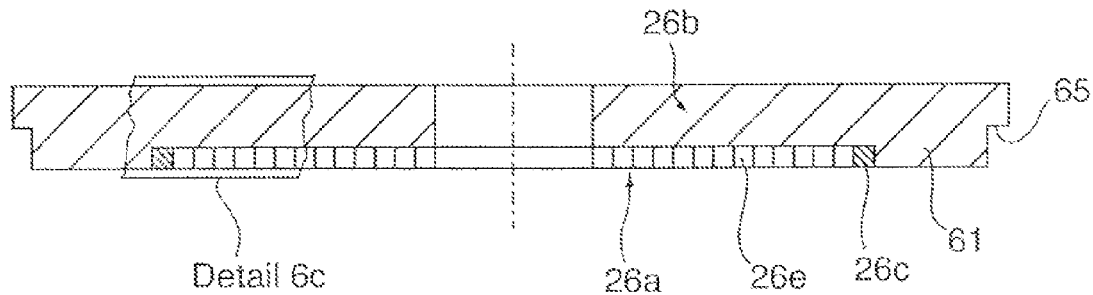
FIG. 6b is a cross-sectional view along line 6B-6B of FIG. 6A.
Figure 6C:
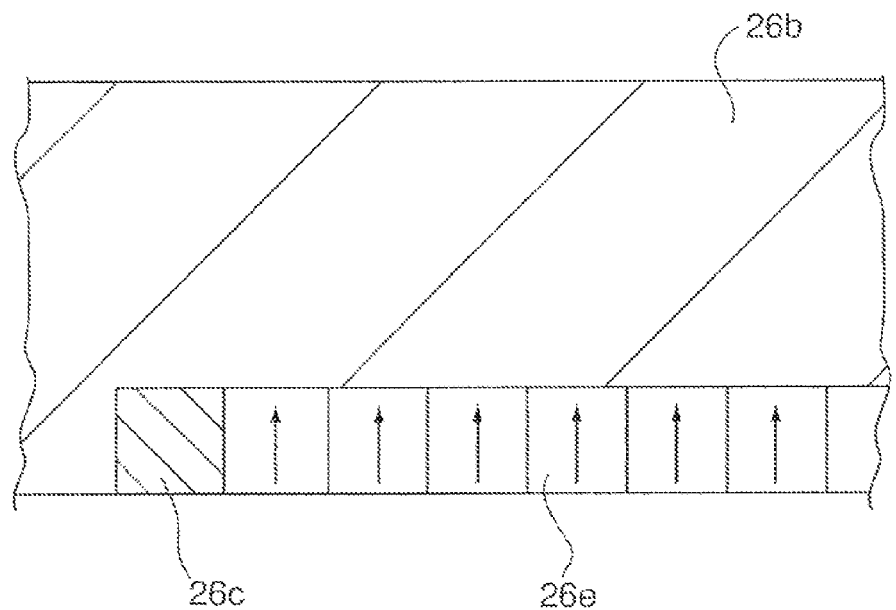
FIG. 6c is an enlarged view of the encircled area 6C of FIG. 6B.

The lower mechanical bearing assembly 47b, shown in FIG. 5, acts between the lower drive shaft segment 24c and the housing bottom plate 33. The lower mechanical bearing assembly 47b has a pair of rolling element bearing sets 42,42 contained within a removable bearing cartridge 42a to facilitate the quick and easy replacement of worn or damaged bearing assemblies. The two rolling element bearing sets 42, are preferably of the same general type and construction as the upper mechanical bearing sets (although the may be of a smaller size due to the lesser mechanical loading), i.e., they are both preferably ceramic angular contact ball bearing sets, and most preferably very high speed, super precision hybrid ceramic bearing sets.

The cartridge 42a of lower mechanical bearing assembly 47b further includes bearing support flange 53 having a bearing recess 90. Lower drive shaft segment 24c has a shoulder 89 to locate the bearings 42 axially. A bearing preload cap 54 is secured by, bearing preload screw 32, to the lower drive shaft 24c. The bearing preload cap 54, and bearing preload screw 32 axially restrain the inner races of each of the rolling element bearing sets 42,42 and apply a preload to the rolling element bearing sets 42,42 by compressing the inner races between an end surface 58 of the bearing preload cap 54 and the lower bearing shoulder 89 of the lower drive shaft segment 24c. The outer races 42c of the rolling element bearing sets 42 are unrestrained axially inside the bearing recess 90 of lower mechanical bearing assembly 47b. This allows the lower drive shaft segment 24c of the rotor 25 to move axially as the rotor 25 contracts axially at high speed due to Poisson Ratio effects. This also allows for axial movement due to temperature induced expansion and contraction in both the rotor 25 and the first housing 21, whilst maintaining the gap 30 substantially constant.

The bearing support flange 53 is fixed to base plate 33 of the first housing 21 by way of machine screws 56. The lower mechanical bearing assembly 47b also preferably comprises lower bearing cover 55, which provides, with the assistance of resilient gasket or O-ring 57, vacuum tight sealing of the lower mechanical bearing assembly 47b, as well as provides a point to mechanically support or lock the rotor 25 against axial vibration or movement during, for example, installation or shipping A jack screw 57 is inserted in a threaded hole 40 formed for this purpose in the lower bearing cap 55 to engage a socket 32a formed in the head of the bearing preload screw 32. The jack screw 57 supports the rotor both axially and radially when engaged in the socket to inhibit transient loads being applied to the bearing assemblies 47.

In order to minimize the wear on the mechanical bearing assemblies and in order to minimize friction as the flywheel 24 is rotating, it is preferable, but not essential, for the magnetic thrust bearing assembly 26 to support substantially the entire weight of the flywheel 24. More specifically, it is preferable for the magnetic thrust bearing assembly 26 to support at least 90% of the flywheel's 24 weight, and more preferably between about 95% and 100% of the flywheel's 24 weight. In an ideal situation, the preferred embodiment, as illustrated, the magnetic thrust bearing assembly 26 is capable of supporting substantially 100% of the flywheel's weight. The axial location provided by the upper bearing assembly 47 a, maintains the gap 30 constant, even if the magnetic bearing assembly 26 provides a lift greater than the weight of the rotor.

FIG. 8 illustrates the flux path generated by the magnetic thrust bearing assembly 26 of FIGS. 2 through 4. As illustrated in FIG. 8, the flux field 62 is ovoid/circular. However, in three dimensional representations of the energy storage system 20, the magnetic flux path is torroidal in shape. As previously discussed, the downwardly depending perimeter skirt portion 61 helps shape the magnetic field and thus contributes to the inherent stability of the rotor 25 while the rotor 25 is rotating during operation of the energy storage system 20. The annular backing plate 26b and downwardly depending perimeter skirt portion 61 create a flux field 62 that holds substantially the entire weight of the rotor 25. FIG. 8 illustrates the magnetic flux substantially penetrating the rotor 25 to lift same, and to a lesser extent penetrating the annular backing plate 26b and downwardly depending perimeter skirt portion 61. The non magnetic spacer ring 26c inhibits migration of the flux field from the magnet 26 a and facilitates the establishment of the compact magnetic loop. The non-magnetic wall 28 of the housing 21 also does not interfere with the flux path to enhance the lifting capacity of the magnetic bearing assembly 26. In a preferred embodiment the permanent magnet occupies approx. 60% of the area of the end face 25 indicated at A1, and 40% of the area is the skirt indicated at A2. Other area ratios may be adopted with a ratio of 30% the permanent magnetic and 70% the skirt up to 70% of the permanent magnet and 30% the skirt. Use of backing plate in this manner allows for 40% less magnetic material and provides 4× the lifting force of the magnets alone. Stray flux is contained, directed into the rotor face and prevented from curving back down to the rotor sides and causing a significant drag torque on the system. Additionally, utilizing the large available upper annular surface area of the rotor facilitates the use of lower strength, bonded magnetic materials. These materials are lower cost and easily formable compared to sintered magnets.

It is preferred that zero electrical energy is required to be drawn from the power source to which the energy storage system 20 is connected to support the weight of the flywheel 24. This is achieved through the use of permanent magnetic material in the construction of the annular permanent magnet 26a. Thus no energy is consumed by the magnetic thrust bearing assembly 26 in supporting the weight of the flywheel 24. Moreover, as the magnetic thrust bearing assembly 26 is mounted to the first housing 21, the weight of the flywheel 24 is supported by attractive forces of the magnetic thrust bearing assembly 26, which is itself supported by the cylindrical outer wall 28 of the first housing 21, which is, in turn, supported by the base plate 33 of the first housing 21.

In the preferred embodiment illustrated in FIGS. 1 through 5, the energy storage system 20 is made more efficient by minimizing the frictional forces which might otherwise act directly on the rotor 25 as it rotates. Accordingly, the rotor 25 should not come into contact during rotation with the any of the internal surfaces projecting into the first housing 21, including the lower face 26d of the magnetic thrust bearing assembly 26. To this end, it has been described above how the gap 30 between the top surface 25a of the rotor portion 25 and the lower faces 26d and 85 of the annular permanent magnet 26a and the downwardly depending perimeter skirt portion 61, respectively, are maintained. To the same end, a minimum clearance gap 70 is at all times defined between the outer circumferential edge 25c of rotor 25 and the internal surface 82 of first housing 21. Similarly, the components within the first housing 21 are shaped and otherwise dimensioned to maintain at all times a minimum clearance gap 75 between the lower surface 25b of the rotor 25 and the upper internal surface 98 of the base plate 33.

To further reduce and substantially eliminate drag forces acting on the rotor 25 during operation (i.e., while the flywheel 24 is rotating), it is desirable to reduce windage losses on the rotating components by drawing at least a partial vacuum within at least the first housing 21, and preferably within both the first housing 21, and second housing 22. To this end, it is preferred to seal both the first 21 and second 22 housings to atmosphere by, for example, the placement of resilient gaskets or O-rings 86,57 in operative sealing relation around all mating joints of the components of the two housings 21,22, including, without limitation, between the wall components 27,28 and 33 of the first 21 and second 22 housings, and between the bearing preload cap 54 and the bearing support flange 53, as best seen in FIGS. 2, 4 and 5.

A vacuum source, such as a conventional vacuum pump 91, is preferably connected by flexible tubing or the like to the interior volume of the first housing 21 by connection to, for example, a vacuum port 87 attached to, or formed in, for example, the base plate 33, so as to be in fluid communication with the gaps 30,70 and 75, thereby to allow for the drawing of at least a partial vacuum within the first housing 21 upon operation of the vacuum pump.

It is also preferable, though not essential, to operatively connect a vacuum source, being preferably the same vacuum source mentioned in the previous paragraph, but optionally being a second vacuum source (not shown), to the second housing 22 to also create an at least partial vacuum in the second housing 22, thereby to reduce frictional losses that would otherwise occur upon rotation of components of the motor/generator 72. A particularly preferred manner of introducing such an at least partial vacuum initially created in the first housing 21 into the second housing 22 without the need for a second vacuum source, is by providing for a vacuum passageway 187 to be established between the first housing 21 and second housing 22 when assembled together as shown in the figures. As seen in FIG. 4, vacuum passageway 187 extends in fluid communication through the coupling shaft 34, the key 34a and the keyway 34b, around the inner races 42b of the two rolling element bearing sets 42 of the upper mechanical bearing assembly 47a, downwardly past the inner radial surface of the bearing support flange 43, to connect with a radial channel 50. Channel 50 surrounds the basal connection point of the upper drive shaft segment 24a to the rotor 25. The radial channel is itself in fluid connection with the gap 30. In this manner, the vacuum source operatively connected to the first housing 21 is also operatively connected to the second housing 22 through vacuum passageway 187 upon mounting of the second housing 22 atop the first housing 21.

The vacuum pump 91 is preferably energized from electricity drawn from the electrical power grid to which the energy storage system 20 is connected during its charging phase, but may, or may not, depending upon design choice, be energized from electricity supplied by the motor/generator 72 during periods when the electrical grid is not available to supply such electrical energy. In either case, the sealing of the first 21 and second 22 housings should ideally, but not essentially, be designed and built to sustain said at least partial vacuum over the full design period of rotation of the rotor 25 during de-energization of the motor/generator 72, so as to minimize drag forces acting on the rotor 25 during such periods. To minimize energy consumption, the vacuum pump 91 may be controlled to switch off when a partial vacuum is drawn with a check valve 92 to inhibit leakage in to the housing 20.

The motor/generator 72 is connected to an external electrical power source so as to enable the motor/generator 72 to draw electrical energy from an electrical power source, such as an electrical power grid, when the connection is energized.

The motor/generator 72 draws electrical energy from the electrical power grid in order to drive rotation of the rotor 25. The driving of the rotor 25 by the motor/generator 72 effectively converts the electrical energy inputted into the system into kinetic energy that is stored in the rotation of the rotor 25 of the flywheel 24. The kinetic energy stored in the rotation of the rotor 25 is thus stored in the energy storage system 20 for reconversion to electrical energy and release of the electrical energy during rotation of the motor/generator by the flywheel 24, when the connection is de-energized.

According to the preferred embodiment illustrated, the second housing 22, having the motor/generator 72 mounted therein, is releasably mounted atop the first housing 21. The modular construction of the energy storage system 20 allows the charge/discharge power used and generated by it to be readily altered without redesigning or disassembling the entire system by increasing/decreasing the motor/generator 72 size on any given energy storage system 20. FIG. 3 illustrates the motor/generator 72 being connected to the upper drive shaft segment 24a in a releasable manner through coupling shaft 34 as described above. The second housing 22 is connected to the first housing 21 in a releasable manner by bolts passing through the flange 64 and in to the annular backing plate 26b. It will be noted that the coupling does not affect the positioning of the bearing assembly 47a, thereby maintaining the required clearance between the rotor 25 and the magnetic bearing assembly 26. By virtue of the releasable coupling of the motor/generator 72 to the upper drive shaft segment 24a and the releasable coupling of the second housing 22 (in which the motor/generator is mounted) to the first housing 21, the energy storage system 20 is effectively constructed or assembled in a modular manner so as to facilitate the replacement of worn or damaged parts, or the interchanging of motors/generators having a particular desired power rating in order to more effectively or efficiently store and discharge electricity in accordance with a predetermined criteria. The modular nature of the preferred embodiment illustrated in FIG. 3 facilitates varying the ratings or power specifications of the motor/generator once the flywheel energy storage system has been manufactured. It is also preferable, but not essential, that the second housing 22 and the motor/generator 72 mounted therein are readily removable and interchangeable without the need for disassembly of the first housing 21 or any of the structures contained therewithin. Accordingly, modular construction of the energy storage system 20 as illustrated and described herein allows the charge/discharge power ratings of the energy storage system 20 to be readily altered or customized by increasing/decreasing the motor/generator size or type on any given energy storage system 20. This flexibly allows an energy storage system 20 having the same flywheel stored energy capacity (e.g. 20 kWH) to be utilized either for Long Duration, Low Power (e.g. Peak Shifting/Time of Use) or Short Duration, High Power (e.g. Voltage Support) applications with only quick and easy swapping out of a different motor/generator unit mounted within interchangeable second housings.

In the preferred embodiment illustrated in FIGS. 1 through 5, the motor/generator 72 shown is an induction type motor/generator 72. More particularly, the preferred motor/generator 72 illustrated is preferably a three-phase induction type unit, which is comprised of a rotor 74, press fit onto the coupling shaft 34, and a stator winding 76, pressed into the inside circumference of the cylindrical outer wall 22a of the second housing 22.

As illustrated in FIGS. 1 through 4, the motor/generator 72 is preferably liquid cooled, such that the second housing 22 also preferably includes a coolant jacket comprised of a main coolant channel 80 encircling the outer surface of the cylindrical outer wall 22a of the second housing 22, said main coolant channel 80 being enclosed on its outer periphery by a removable outer shell 88. O-ring seals 81 assist in sealing the removable outer shell 88 to the cylindrical outer wall 22a of the second housing 22. Coolant flows into ingress port 38, passes through the main coolant channel 80, and then outward through egress port 39. The coolant flow can be via an external pump, or natural convection (in which case the ingress 38 and egress 39 ports are beneficially reversed from the arrangement shown) in order to the remove waste heat from the second housing 22 and the stator winding 76.

Electrical cable connections to the motor/generator 72 are preferably made through the top plate 35 at port 41, which port should be made vacuum tight around such connections by rubber grommets, O-ring seals and the like (not shown).

It will be appreciated that the rotor 25 is, as shown in the Figures, solid and comprised of high strength steel. At least a portion of the rotor 25 must be ferromagnetic in order to interact with the magnetic thrust bearing assembly 26. Preferably, at least an upper portion of the rotor opposite the bearing assembly 26 is magnetic, and, as a further preference, the entire rotor 25 is ferromagnetic. It may preferable in some embodiments of the energy storage system 20 for the rotor 25 to have a mass between about 1,000 kg and 5,000 kg with 3,000 kg a preferred mass.

In operation, power is supplied to the rotor/generator 72 which applies a torque to accelerate the rotor 25. It is preferable, but not essential, that the motor/generator 72 be capable of rotating the rotor 25 at high speed, between about 10,000 and 20,000 RPM. As the rotor 25 accelerates, it stores the energy supplied by the rotor/generator 72 as kinetic energy. Upon attainment of the maximum speed, the electrical power may be disconnected. In a typical implementation for the maximum rotation speed of the rotor 25 is obtained within 2 hours of the electrical connection to the motor/generator 72 being energized by the power grid. It also be preferable, but not essential, such high speed rotation of the rotor 25 continue for at least 6 hours following the electrical connection to the power grid being de-energized. If the power is disconnected, or if additional electrical energy is required by the grid, the motor/generator is switched to a generating mode and the energy stored in rotor 25 drives the generator and supplies electrical power. In some embodiments, the storage capacity of the energy storage system 20 is approximately 20 kWh. The energy storage is a function of the weight of the flywheel and the speed at which the flywheel 24 is rotated. During rotation the gap 30 is maintained by the bearing assembly 47a. Changes in axial dimensions, due to thermal changes or dynamic forces, is accommodated in the lower bearing 47b which may slide axially relative to the end plate 33. The flux path described in FIG. 8 ensures the rotor 25 is maintained axially by the magnetic bearing and accordingly, the axial loads in the bearings 47a, 47b are reduced.

Because of the relationship between an energy storage system's 20 energy storage limitations and an energy storage systems' 20 inherent size and weight, it may be advantageous and preferable in some applications to use, or otherwise require the use of, a plurality of smaller energy storage systems 20 in favour of a lesser number of large energy storage system 20 constructed according to the preferred embodiment. An array of relatively smaller energy storage systems 20 allows for users to store a greater amount of energy in the form of kinetic energy whilst maintaining ease of deployment and greater flexibility to accommodate for electrical power requirements of different scales in particular applications. In such situations, it may be preferable that the array of energy storage systems be controlled by a common control unit. Further, it may be even more preferable that the common control unit controls the electrical energy draw and the release of energy from each of the energy storage systems 20 in the array of energy storage systems. For some commercial embodiments, it may be preferable to have an array of energy storage systems having a collective energy output of at least 500 kWh.

Figure 9:
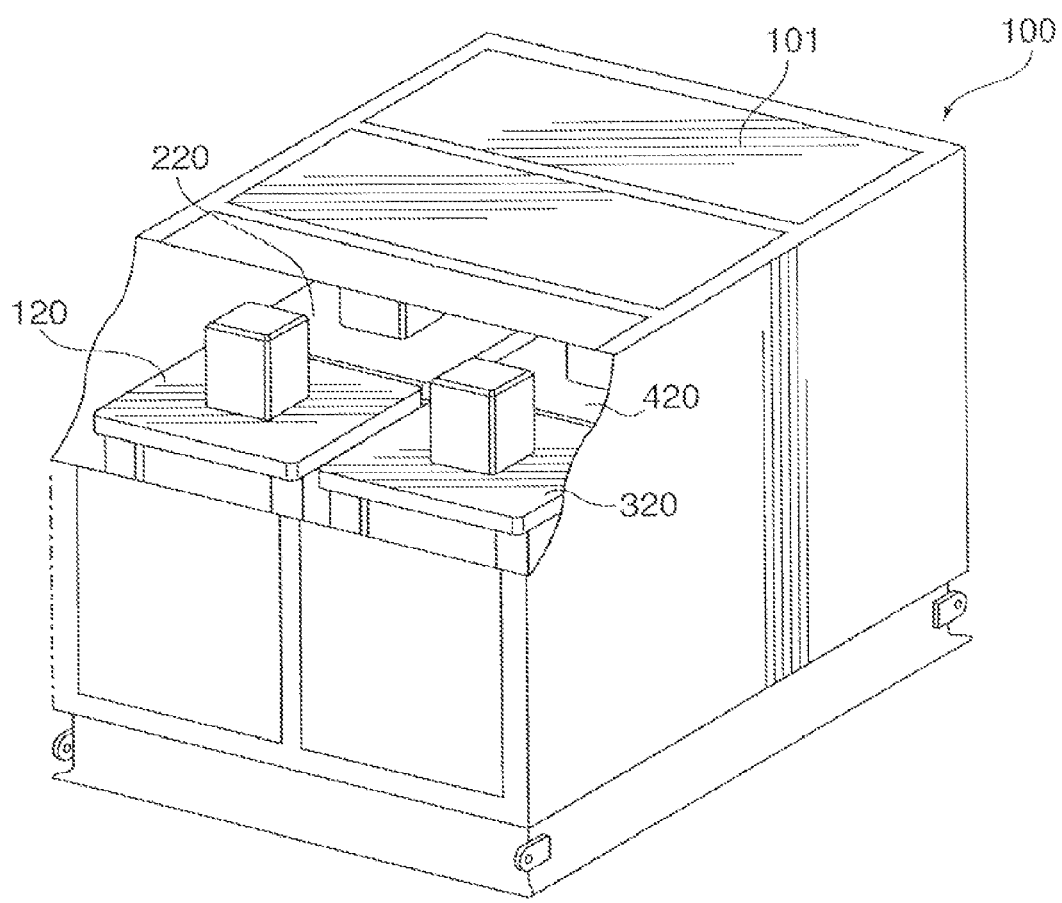
FIG. 9 is a perspective view of an array of energy storage systems contained within a collective container, with the collective container being partially cut away.

In this regard, FIG. 9 illustrates an array 100 of energy storage systems 120, 220, 320, and 420 being contained within a collective container 101.

Figure 10:
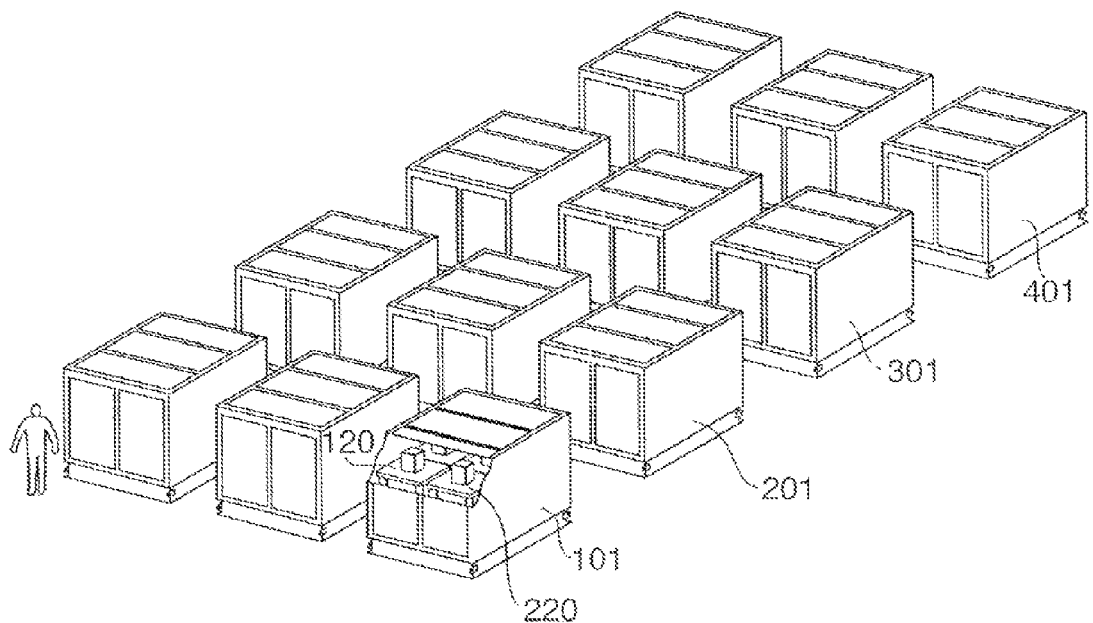
FIG. 10 is a perspective view of an array of collective containers, each similar to the collective container illustrated in FIG. 9.

FIG. 10 illustrates an array or a plurality of collective containers 101, 201, 301, 401 each of which contains an array of energy storage systems 120, 220, 320, etc.

Figure 11:
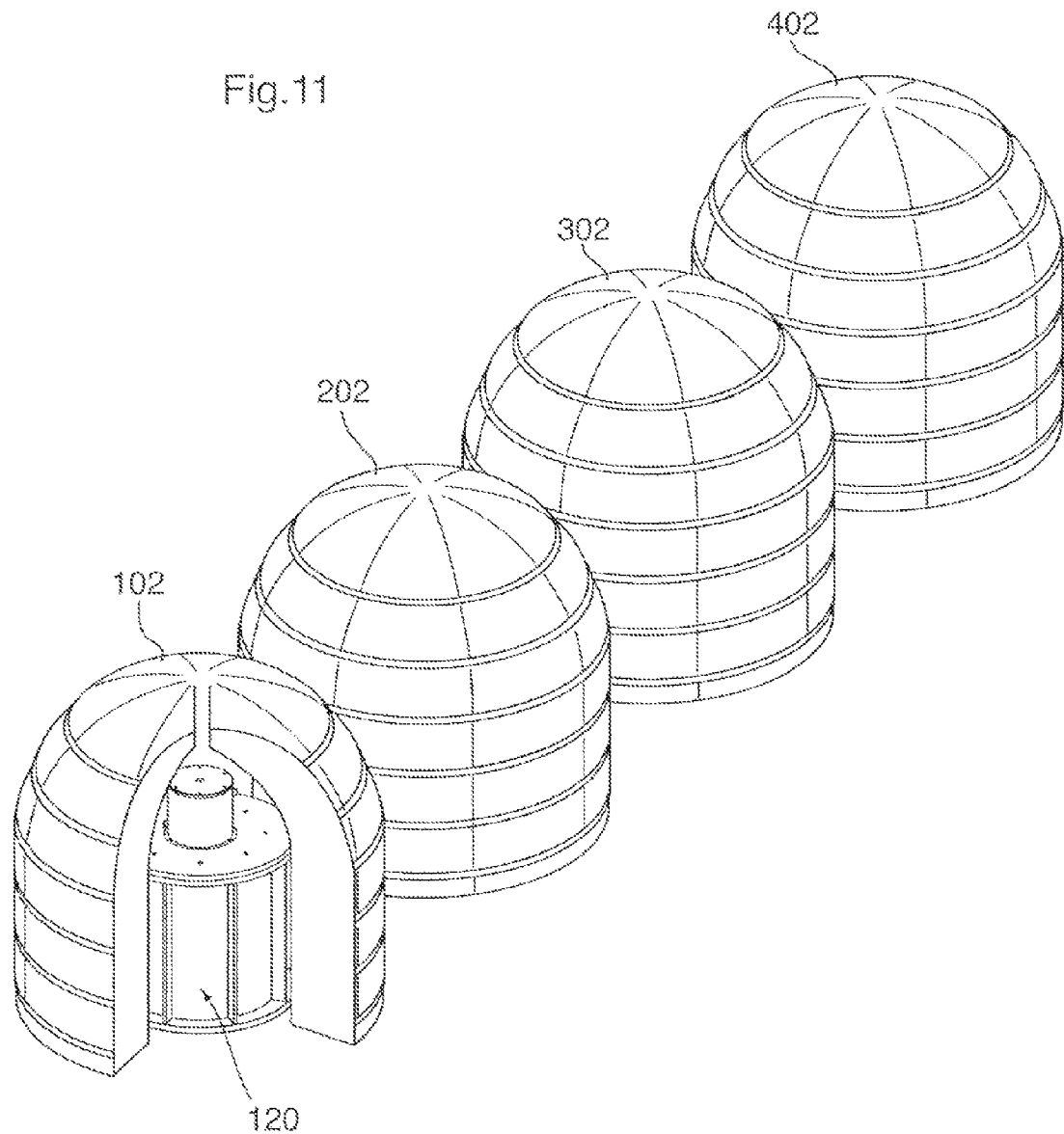
FIG. 11 is a perspective view of an array of above grade domed vaults that each house an energy storage system; and, FIG. 12 is a cross-sectional view of an array of below-grade vaults that each house an energy storage system.
Figure 12:
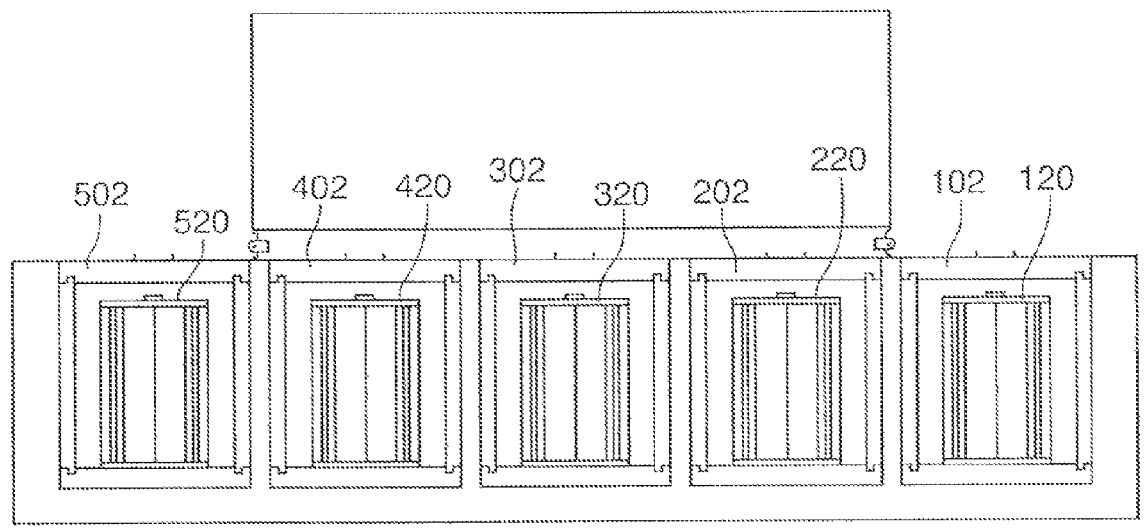

FIG. 11 illustrates an array of domed vaults 102, 202, 302, and 402. Each of the vaults is above grade and houses an energy storage system 120 therewithin. Similarly, FIG. 12 illustrates in section an array of concrete vaults 102, 202, 302, 402, and 502. Each of the vaults 102, 202, 302, 402, and 502 may be located below-grade, and each houses an energy storage system 120, 220, 320, etc., respectively.

Figure 13:
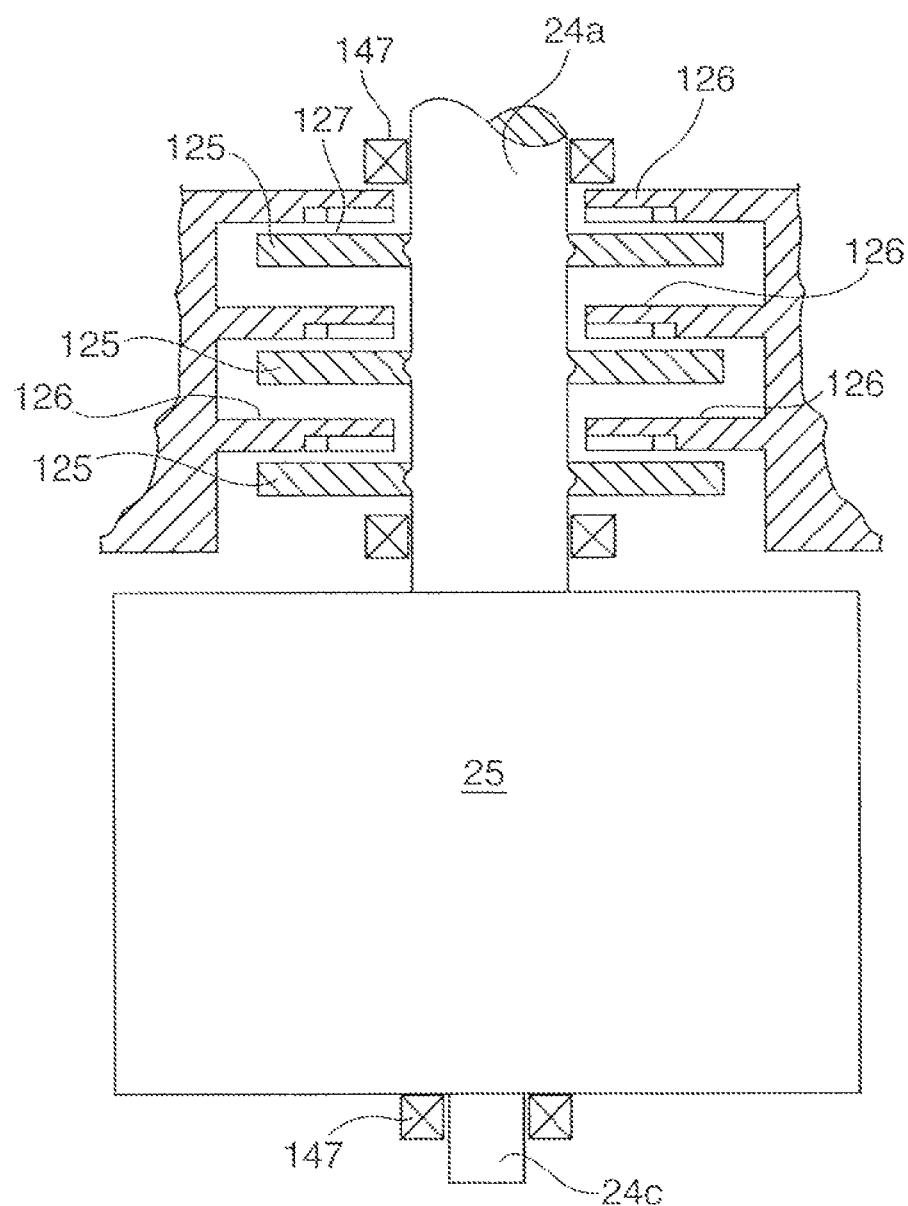
FIG. 13 is an alternative configuration of energy storage system.

The provision of the flywheel support with one of the bearing assemblies axially locating the shaft and the other bearing permitting the drive shaft to float axially facilitates alternative configurations of rotor. As shown in FIG. 13, the rotor 25 is formed with ancillary rotor discs, 125 spaced along the drive shaft 24*a*, Each of the discs 125 has an upper face 127 directed toward a respective permanent magnet thrust bearing 126 which is located within the housing 21. Upper bearing assemblies 147 axially locate the rotor 25 with a lower bearing assembly 147 radially permitting relative axial movement.

The discs 125 are formed from a ferromagnetic material and the thrust bearings 126 have a similar configuration to the thrust bearing shown in FIG. 4, with an annular permanent magnet and a surrounding skirt overlapping the discs.

The magnetic thrust bearings attract respective ones of the discs 125 to support the mass of the rotor 25, as described above.

It will be appreciated that the array of discs 125 may be formed on the lower drive shaft 24*c* to support the rotor from beneath by attraction.

Various other modifications and alterations may be used in the design and manufacture of the energy storage system according to the present invention without departing from the spirit and scope of the invention, which is limited only by the accompanying claims. For example, separate and apart from the use of the liquid cooling means illustrated in the Figures, the second housing 22 could additionally be fabricated with external cooling fins for convective or forced air cooling to the ambient atmosphere.

What is claimed is:

1. An energy storage system comprising:
a first housing having an end face;
a flywheel having:
    a rotor, and
    a drive shaft defining a substantially vertical axis about which the rotor is mounted for rotation within the first housing;
a permanent magnetic bearing assembly positioned between the end face and the rotor and having a permanent magnet mounted on the first housing, and the rotor having ferromagnetic properties, to attract the rotor towards the end face;
a first mechanical bearing assembly acting between the first housing and the rotor to provide radial positioning of the rotor and to limit upward axial movement of the rotor in relation to the end face, the rotor being spaced from the end face by a clearance gap; and
a second mechanical bearing assembly spaced from the first mechanical bearing assembly along the drive shaft and acting between the first housing and the rotor to provide radial positioning of the rotor, the second mechanical bearing assembly permitting relative axial movement between the drive shaft and the first housing,
wherein the permanent magnet is mounted on the end face,
wherein the permanent magnetic bearing assembly further includes:
    an annular backing plate of ferromagnetic metal mounted to a top wall surface of the first housing in stationary centered relation about the vertical axis, the backing plate having a radius greater than or equal to a radius of the rotor, the permanent magnet being magnetically attached to an undersurface of the backing plate and to an adjacent layer of magnetized material.

2. The energy storage system according to claim 1, wherein the first mechanical bearing assembly also limits downward axial movement of the rotor in relation to the end face, limiting the size of clearance gap.

3. The energy storage system according to claim 1, wherein the end face of the first housing extends radially beyond the permanent magnet to overlie the rotor.

4. The energy storage system according to claim 3, wherein the clearance gap is maintained beyond the permanent magnet.

5. The energy storage system according to claim 3, further comprising a non-magnetic barrier between the permanent magnet and the end face.

6. The energy storage system according to claim 1, wherein the permanent magnet is magnetized parallel to the vertical axis.

7. The energy storage system according to claim 1, wherein the permanent magnet includes a layer of magnetized material.

8. The energy storage system according to claim 1, wherein the permanent magnet includes a plurality of vertically stacked layers of magnetized material, each of the layers having its poles aligned in a same magnetic direction as any adjacent layer of the plurality of vertically stacked layers.

9. The energy storage system according to claim 8, wherein the layer includes a plurality of elongate strips of magnetized material laid parallel to one another in a side-by-side contacting relationship.

10. The energy storage system according to claim 8, wherein the layers are formed in a series of concentric circles of widening radius wrapped around the vertical axis, and formed of magnetized material comprised of rare earth magnetic particles and a polymer binder.

11. The energy storage system according to claim 1 wherein the permanent magnet is further attached to the backing plate and to the adjacent layer by an adhesive.

12. The energy storage system according to claim 1, wherein the permanent magnetic bearing assembly supports at least 90% of the weight of the flywheel.

13. The energy storage system according to claim 1, wherein the permanent magnetic bearing assembly supports at least 95% of the weight of the flywheel.

14. The energy storage system according to claim 1, wherein the permanent magnetic bearing assembly supports between 95 to 100% of the weight of the flywheel.

15. The energy storage system according to claim 1, wherein the first and second mechanical bearing assemblies are each detachably attached within the first housing and/or a second housing in bearing cartridges.

16. The energy storage system according to claim 1, wherein the first mechanical bearing assembly includes a rolling element bearing and an adjustment mechanism to preload the bearing.

17. The energy storage system according to claim 1, wherein the first housing is sealed to atmosphere, and wherein a vacuum source is operatively connected thereto to draw at least a partial vacuum within the first housing.

18. The energy system according to claim 17, wherein a vacuum source is operatively connected to the second housing by a vacuum passageway between the first housing and a second housing.

19. The energy storage system according to claim 1, further comprising:
  a second housing releasably mounted to the first housing, and
  a motor/generator mounted within the second housing for connection to the drive shaft.

20. The energy storage system according to claim 19, wherein the first housing comprises a non-ferromagnetic material.

21. The energy storage system according to claim 20, wherein the non-ferromagnetic material is selected from the group consisting of stainless steel, aluminum, plastics, fibreglass, cement, concrete, elastomer, rubber, and combinations thereof.

22. The energy storage system according to claim 19, wherein the motor/generator is releasably coupled to the drive shaft by a coupling shaft projecting from the motor/generator for engagement with the drive shaft.

23. The energy storage system according to claim 19, wherein the motor/generator is an induction motor/generator.

24. The energy storage system according to claim 23, wherein the motor/generator is a three-phase induction type motor/generator.

25. The energy storage system according to claim 19, further comprising a cooling system to extract waste heat from the second housing.

26. The energy storage system according to claim 25, wherein the cooling system further comprises a coolant channel within walls of the second housing.

27. The energy storage system according to claim 1, wherein a rotation speed of the rotor is between 10,000 and 20,000 RPM.

28. The energy storage system according to claim 27, wherein the mass of the rotor is between 1,000 kg. and 5,000 kg.

29. An energy storage system array comprising a plurality of energy storage systems according to claim 1.

30. The energy storage system array according to claim 29, further comprising a collective first housing within which the plurality of energy storage systems is contained.

31. The energy storage system array according to claim 29, further comprising a common control unit that controls electrical energy draw and release of each of the plurality of energy storage systems.

32. The energy storage system array according to claim 29, wherein the energy storage system array has a collective energy output of at least 500 kWh.

33. An energy storage system according to claim 19, wherein the second housing is releasably mounted atop the first housing.

34. An energy storage system according to claim 19, wherein the second housing is releasably mounted below the first housing.

35. The energy storage system according to claim 1, wherein a flux path is established between the backing plate and the rotor.

36. The energy storage system according to claim 1, wherein the permanent magnetic bearing assembly further includes a non-magnetic spacer ring between the outer radial edge of the backing plate and an inner radial edge of the permanent magnet.

37. An energy storage system comprising:
  a first housing having an end face;
  a flywheel having:
    a rotor, and
    a drive shaft defining a substantially vertical axis about which the rotor is mounted for rotation within the first housing;
  a permanent magnetic bearing assembly positioned between the end face and the rotor and having a permanent magnet attached to the first housing, the rotor having ferromagnetic properties, to attract the rotor towards the end face;
  a first mechanical bearing assembly acting between the first housing and the rotor to provide radial positioning of the rotor and to limit upward axial movement of the rotor in relation to the end face, the rotor being spaced from the end face by a clearance gap; and
  a second mechanical bearing assembly spaced from the first mechanical bearing assembly along the drive shaft and acting between the first housing and the rotor to provide radial positioning of the rotor, the second mechanical bearing assembly permitting relative axial movement between the drive shaft and the first housing,
  wherein the permanent magnetic bearing assembly further includes:
    an annular backing plate of ferromagnetic metal mounted to a top wall surface of the first housing in stationary centered relation about the vertical axis, the backing plate having a radius greater than or equal to a radius of the rotor, the permanent magnet being attached to an undersurface of the backing plate,
  wherein the backing plate extends radially beyond an outer radial edge of the permanent magnet to form a downwardly projecting perimeter skirt portion, the perimeter skirt portion having an outer radius greater than or equal to the radius of the rotor, and
  wherein the perimeter skirt portion has a lower surface that is axially co-terminus with a lower face of the permanent magnet to maintain the clearance gap between the rotor and the perimeter skirt portion.

38. The energy storage system according to claim 37, wherein the permanent magnetic bearing assembly further includes a non-magnetic spacer ring between the outer radial edge of the permanent magnet and an inner radial edge of the skirt portion.

* * * * *